US009313480B2

(12) United States Patent
Koito et al.

(10) Patent No.: US 9,313,480 B2
(45) Date of Patent: Apr. 12, 2016

(54) DISPLAY DEVICE IN WHICH MULTIPLE IMAGES ARE DISPLAYED USING FOUR NEIGHBORING PIXELS, DISPLAY PANEL AND ELECTRONIC APPARATUS USING SAME

(75) Inventors: Takeo Koito, Kanagawa (JP); Daisuke Takama, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 250 days.

(21) Appl. No.: 13/609,416

(22) Filed: Sep. 11, 2012

(65) Prior Publication Data

US 2013/0083089 A1    Apr. 4, 2013

(30) Foreign Application Priority Data

Sep. 29, 2011    (JP) ................................. 2011-214867

(51) Int. Cl.
G09G 5/02    (2006.01)
H04N 13/04    (2006.01)

(52) U.S. Cl.
CPC ....... *H04N 13/0409* (2013.01); *H04N 13/0404* (2013.01); *H04N 13/0411* (2013.01); *H04N 13/0422* (2013.01)

(58) Field of Classification Search
CPC .............. G09G 2300/0439; G09G 2300/0465; H04N 13/0445; H04N 13/0447; H04N 13/045
USPC ............ 345/1.1–9, 32, 87, 88, 103, 694–696; 349/84, 149, 15; 348/42–48, 51; 353/7
See application file for complete search history.

(56) References Cited

U.S. PATENT DOCUMENTS

| 5,808,599 A * | 9/1998 | Allio ................................. 345/6 |
| 2003/0048354 A1* | 3/2003 | Takemoto et al. .............. 348/51 |
| 2007/0153380 A1* | 7/2007 | Shestak ......................... 359/463 |
| 2009/0091613 A1* | 4/2009 | Louwsma et al. .............. 348/51 |
| 2010/0302351 A1* | 12/2010 | Yanamoto ....................... 348/55 |

FOREIGN PATENT DOCUMENTS

| CN | 1607417 | 4/2005 |
| CN | 101442685 | 5/2009 |
| CN | 101900886 | 12/2010 |
| GB | 2405546 | * 3/2005 |
| JP | 03-119889 | 5/1991 |
| JP | 07-005420 | 1/1995 |
| JP | 10-186294 | 7/1998 |
| JP | 2007-004179 | 1/2007 |

(Continued)

OTHER PUBLICATIONS

Japanese Office Action issued in connection with related Japanese patent application No. 2011-214867 dated Apr. 8, 2014.

(Continued)

*Primary Examiner* — Ram Mistry
(74) *Attorney, Agent, or Firm* — Dentons US LLP

(57) ABSTRACT

There is provided a display device including a display part including a pixel of a first series having a first horizontal pixel width and a pixel of a second series having a second horizontal pixel width smaller than the first horizontal pixel width, the pixels of the first series and the pixels of the second series being arrayed alternately in each of a horizontal direction and a vertical direction, and a light beam control part that controls a light beam from the display part or a light beam toward the display part.

18 Claims, 31 Drawing Sheets

(56) References Cited

FOREIGN PATENT DOCUMENTS

| | | |
|---|---|---|
| JP | 2007-507001 | 3/2007 |
| JP | 2008-249887 | 10/2008 |
| JP | 2009-009081 | 1/2009 |
| JP | 2009-104129 | 5/2009 |

OTHER PUBLICATIONS

Japanese Patent Office Action corresponding to Japanese Serial No. 2014-246131 dated Jan. 5, 2016.
Chinese Patent Office Action corresponding to Chinese U.S. Appl. No. 201210363805.3 dated Dec. 30, 2015.

* cited by examiner

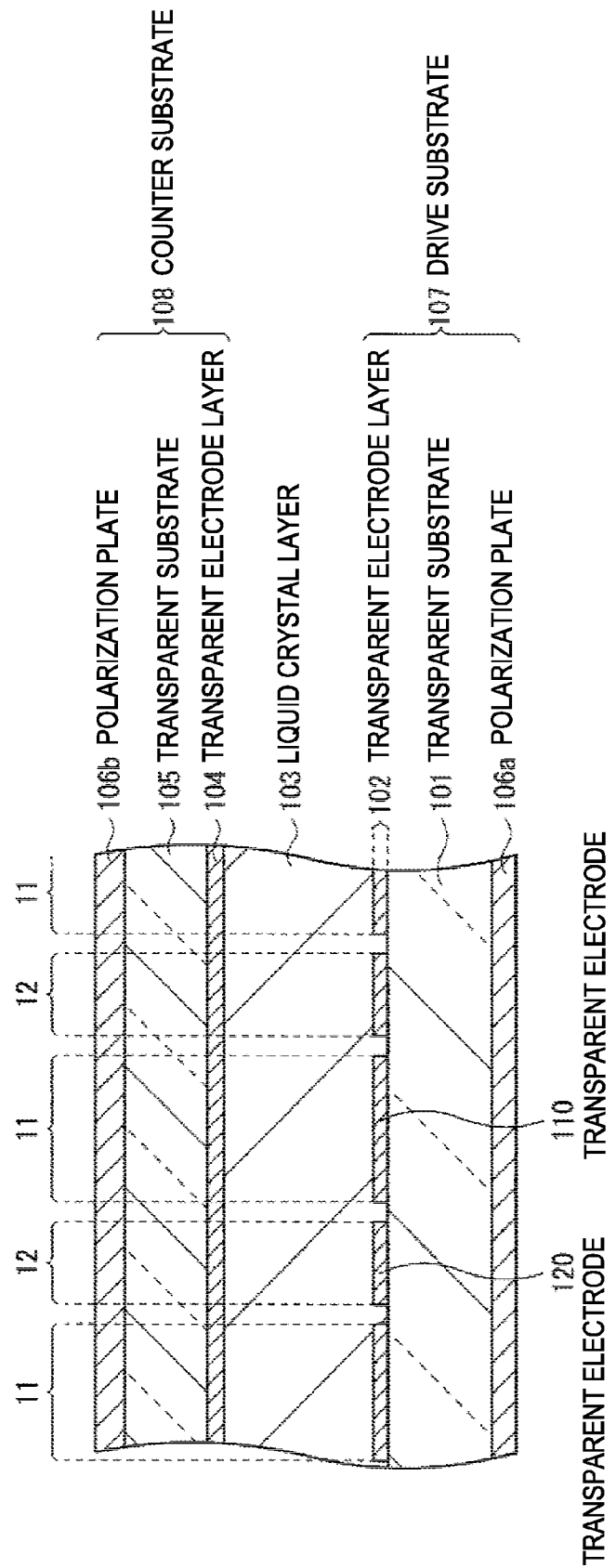

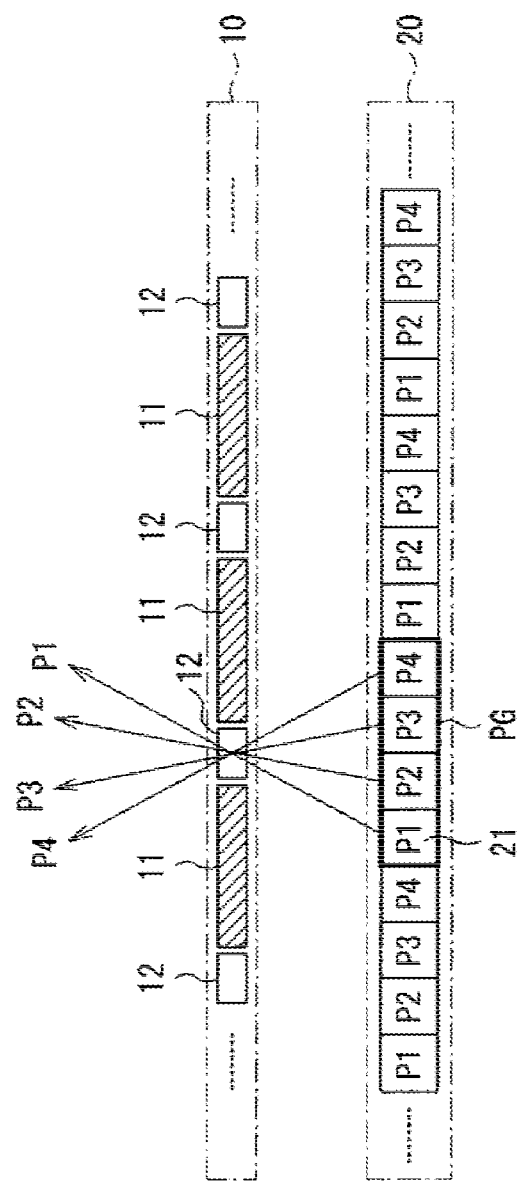

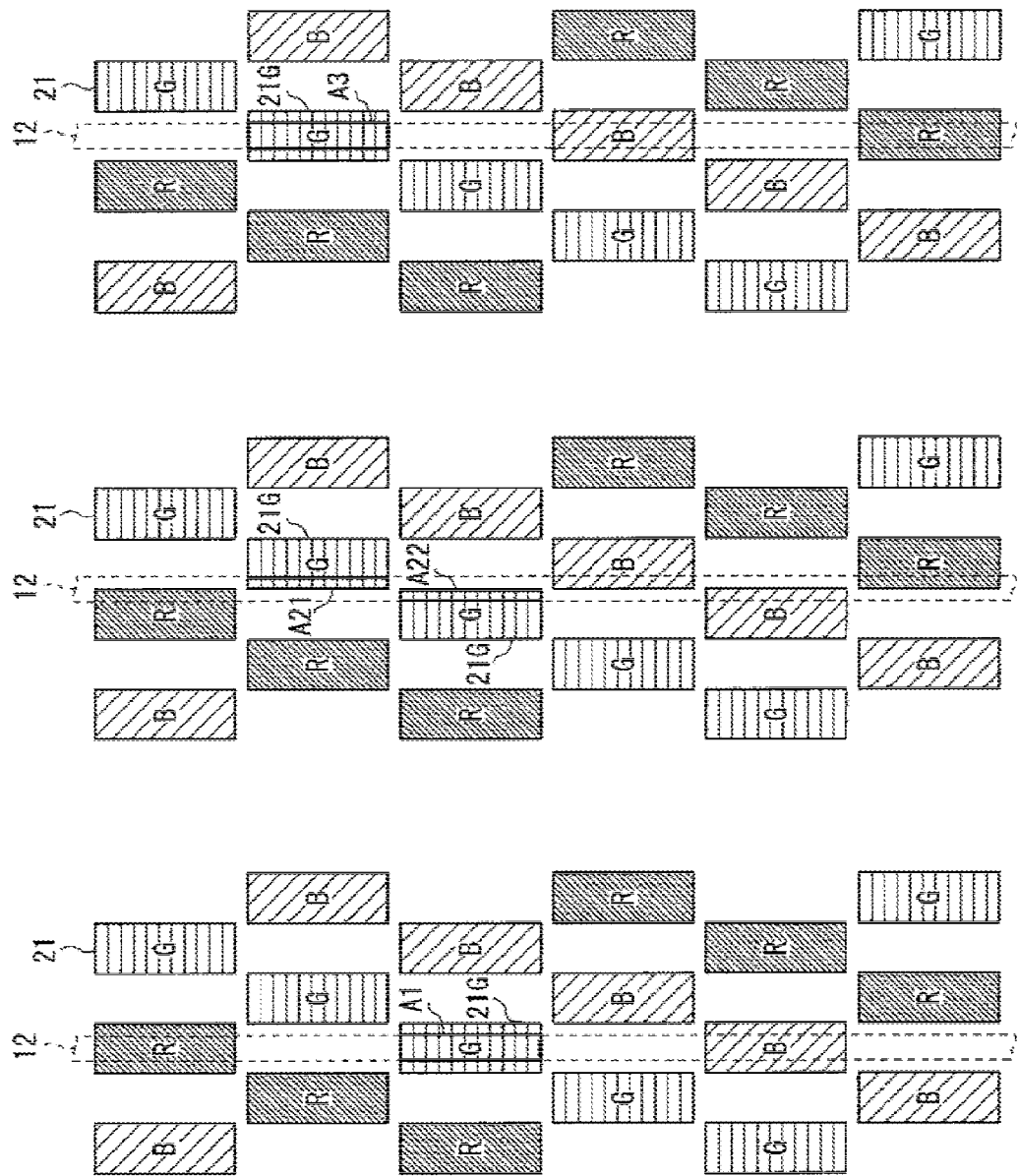

DISPLAY DEVICE IN WHICH MULTIPLE IMAGES ARE DISPLAYED USING FOUR NEIGHBORING PIXELS, DISPLAY PANEL AND ELECTRONIC APPARATUS USING SAME

BACKGROUND

The present disclosure relates to display devices, display panels and electronic apparatus for displaying images.

Recently, display devices capable of performing 3D display are spotlighted. A 3D display displays viewpoint images including parallax (difference in point of view). When a viewer views viewpoint images different from each other with right and left eyes, the viewer recognizes a stereoscopic image with a depth sensation. Also, such a display device has been developed in which three or more images including parallax are displayed, and more natural 3D images are provided to a viewer.

As such display devices, for example, a parallax barrier system and a lenticular lens system are available. These systems are configured to simultaneously display multiple viewpoint images and a viewer watches images different from each other depending on the viewing angle with right and left eyes. For example, JP-A-3-119889 teaches a display device of parallax barrier system in which liquid crystal elements are used as the barrier.

With respect to these display devices of such system, various techniques for improving the image quality have been disclosed. For example, JP-A-2008-249887 teaches a display device which reduces moire caused from relative positional relationship between pixels array and lens or barrier in a display part. Also, for example, JP-A-10-186294 teaches a display device capable of increasing the aperture ratio. Also, for example, JP-A-7-005420 teaches a display device which is capable of displaying images including continuous parallax.

SUMMARY

However, these display devices are desired to further improve the image quality. For example, in a display device capable of 3D display, it is desired to reduce, so-called crosstalk in which left eye image and right eye image are mixed. Also, in addition to 3D display, when a display device is configured to provide ordinarily 2D display, it is desired to enhance the image quality of 2D display.

The present disclosure has been proposed in view of the above problems. Accordingly, the present disclosure is intended to provide a display device, a display panel and an electronic apparatus capable of increasing the image quality.

A display device according to an embodiment of the present disclosure includes a display part and a light beam control part. The display part includes a pixel of a first series having a first horizontal pixel width and a pixel of a second series having a second horizontal pixel width smaller than the first horizontal pixel width, the pixels of the first series and the pixels of the second series being arrayed alternately in each of a horizontal direction and a vertical direction. The light beam control part controls a light beam from the display part or a light beam toward the display part.

A display panel according to an embodiment of the present disclosure includes a pixel of a first series and a pixel of a second series. The pixel of the first series has a first horizontal pixel width. The pixel of the second series has a second horizontal pixel width smaller than the first horizontal pixel width. The pixels of the first series and the pixels of the second series are arrayed alternately in each of a horizontal direction and a vertical direction.

Electronic apparatuses according to an embodiment of the present disclosure includes the above display device; for example, mobile terminal apparatuses such as a television set, a digital camera, a personal computer, a video camera and a mobile phone are applicable.

In a display device, a display panel and an electronic apparatus according to an embodiment of the present disclosure, a light beam passes through the light beam control part thereby an image displayed on the display part is viewed and recognized by a viewer. At this time, in the display part, the display is performed on both of pixels of the first series and pixels of the second series having horizontal pixel width different from each other, which are disposed alternately in the horizontal direction and the vertical direction.

With the display device, the display panel and the electronic apparatus according to an embodiment of the present disclosure, since pixels of the first series and pixels of the second series are arrayed alternately in each of the horizontal direction and the vertical direction, the image quality can be enhanced.

BRIEF DESCRIPTION OF THE DRAWINGS

FIG. 6B is a cross-sectional view thereof;

FIG. 9 is a schematic view illustrating an example of the operation of the 3D display device shown in FIG. 1;

FIG. 10 illustrates a characteristic of the 3D display device shown in FIG. 1;

DETAILED DESCRIPTION OF THE EMBODIMENTS

Embodiments of the present disclosure will be described in detail below referring to the appended drawings. Description will be made in the following order:
1. Embodiments
2. Application example

1. Embodiments

[Configuration Example]
(Example of Entire Configuration)

Figure 1:
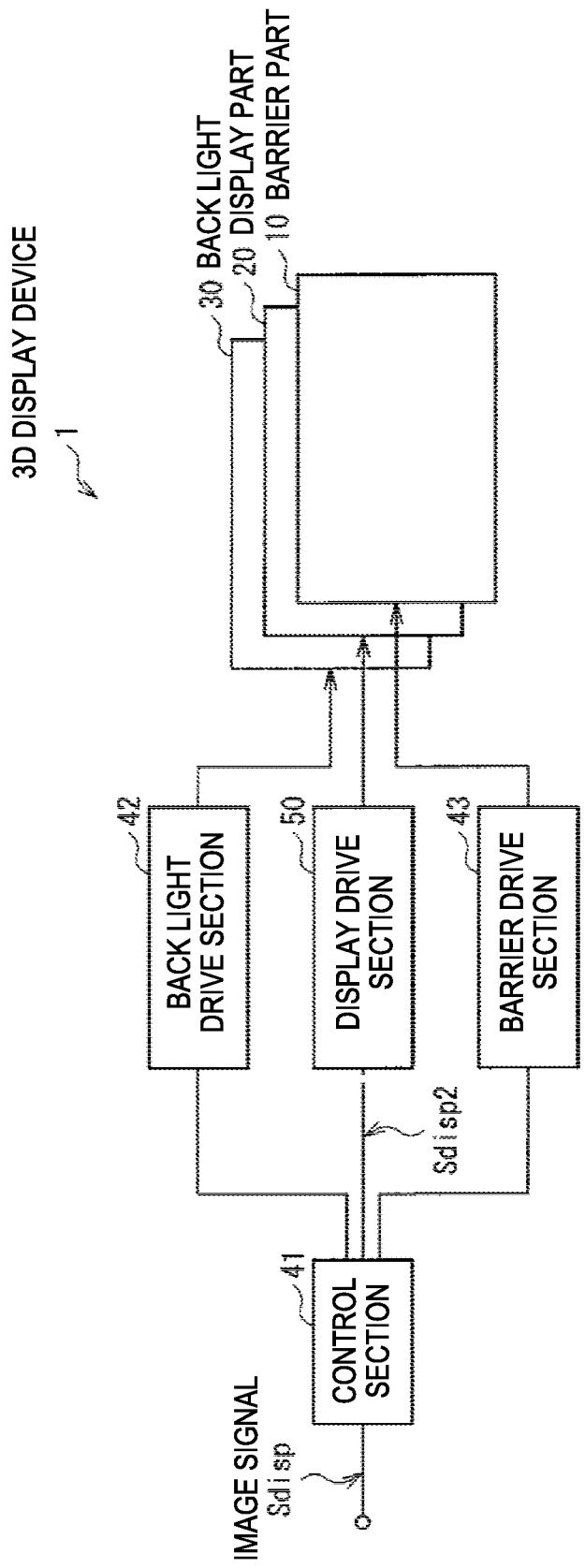
FIG. 1 is a block diagram showing an example of the configuration of a 3D display device according to an embodiment of the present disclosure.

FIG. 1 illustrates an example of configuration of a 3D display device according to the embodiment. A 3D display device 1 is a 3D display device of parallax barrier system. Since a display panel according to the embodiment of the present disclosure is achieved by this embodiment, the description thereof will be made accordingly.

The 3D display device 1 includes a control section 41, a back light drive section 42, a back light 30, a display drive section 50, a display part 20, a barrier drive section 43 and a barrier part 10.

The control section 41 is a circuit that controls the back light drive section 42, the display drive section 50 and the barrier drive section 43 based on an image signal Sdisp supplied from the external. In particular, the control section 41 is configured to supply a back light control signal to the back light drive section 42, to supply an image signal Sdisp2 generated based on the image signal Sdisp to the display drive section 50, and to supply a barrier control signal to the barrier drive section 43. The image signal Sdisp2 is an image signal S2D when the 3D display device 1 performs ordinary display (2D display) which includes one viewpoint image; and when the 3D display device 1 performs 3D display, the image signal Sdisp2 is an image signal S3D which includes multiple (in this example, 4) viewpoint images as described below.

The back light drive section 42 drives the back light 30 based on a back light control signal supplied from the control section 41. The back light 30 has a function to output surface-emitted light toward the display part 20. The back light 30 is configured including, for example, an LED (Light Emitting Diode), a CCFL (Cold Cathode Fluorescent Lamp) or the like.

The display drive section 50 drives the display part 20 based on the image signal Sdisp2 supplied from the control section 41. In this example, the display part 20 is a liquid crystal display part, which is configured to drive the liquid crystal display and modulates light output from the back light 30 to thereby perform a display.

The barrier drive section 43 drives the barrier part 10 based on the barrier control signal supplied from the control section 41. The barrier part 10 allows the light, which is output from the back light 30 and passes through the display part 20, to pass therethrough (open operation) or blocks (close operation) the same, and has multiple open/close parts 11 and 12 (described below) which is configured by using liquid crystal.

In the 3D display device 1, the back light 30, the display part 20, and the barrier part 10 are disposed in this order as shown in FIG. 1. That is, it is arranged so that the light output from the back light 30 reaches to a viewer through the display part 20 and the barrier part 10.

(Display Drive Section 50 and Display Part 20)

Figure 2:
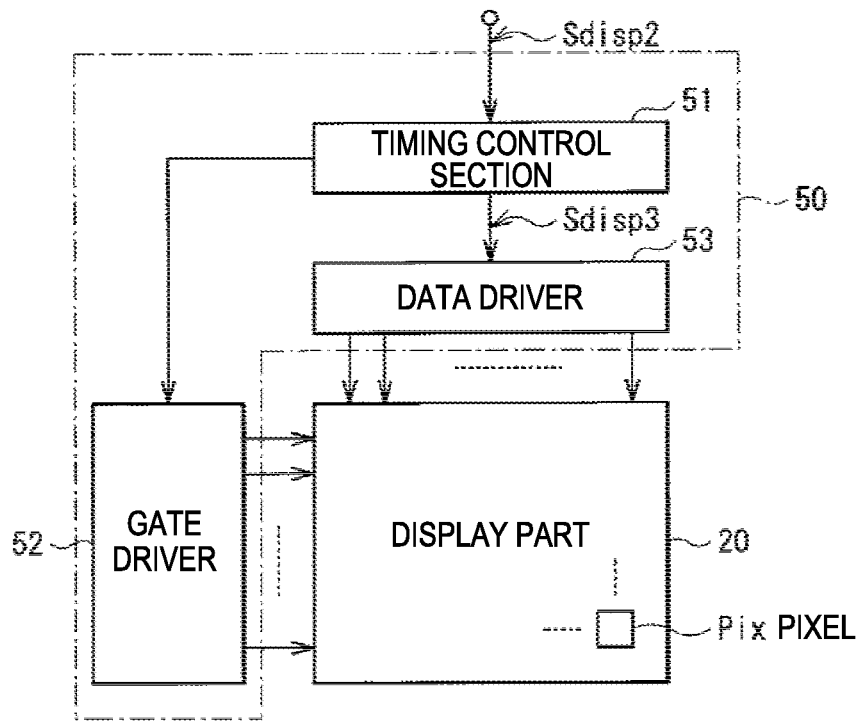
FIG. 2 is a block diagram illustrating an example of the configuration of the display drive part shown in FIG. 1.
Figure 3A:
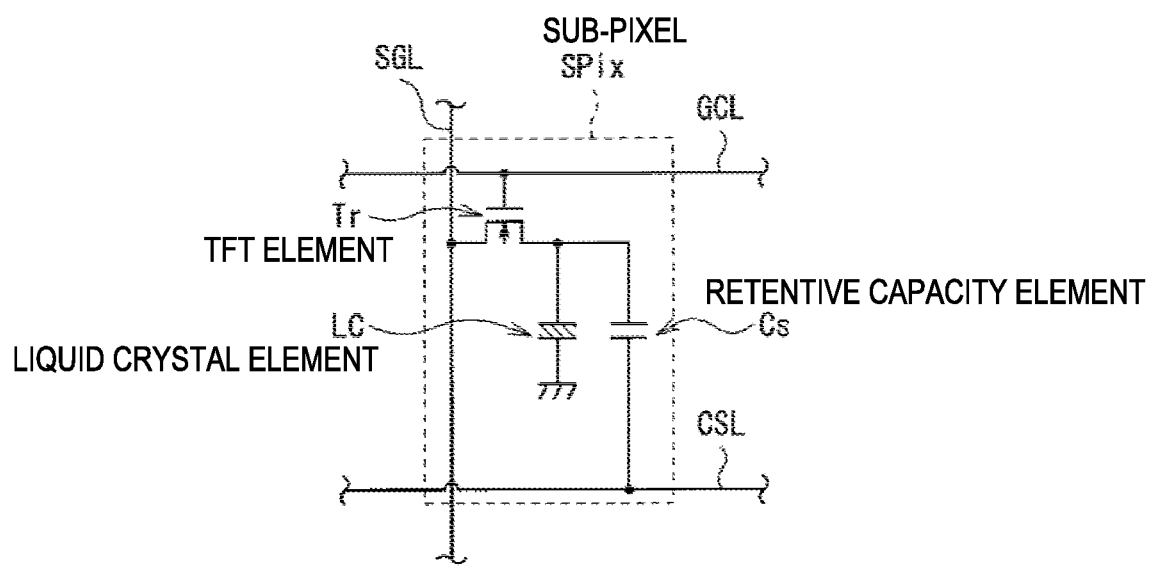
FIG. 3A is a circuit diagram illustrating an example of the configuration of the display part shown in FIG. 1.

FIG. 2 is a block diagram illustrating an example of the display drive section 50. The display drive section 50 includes a timing control section 51, a gate driver 52 and a data driver 53. The timing control section 51 controls the drive timing of the gate driver 52 and the data driver 53, generates an image signal Sdisp3 based on the image signal Sdisp2 supplied from the control section 41 and supplies the same to the data driver 53. The gate driver 52 selects pixels Pix within the display part 20 in order on the line basis in accordance with the timing control by the timing control section 51, to performing the scanning on the lines in order. The data driver 53 supplies a pixel signal based on the image signal Sdisp3 to each of the pixels Pix of the display part 20. In particular, the data driver 53 performs a D/A (digital-analog) conversion based on an image signal Sdisp3 to generate an analog pixel signal, and supplies the same to each of the pixels Pix FIG. 3 illustrates an example of configuration of the display part 20; FIG. 3(A) illustrates an example of a circuit diagram of a sub-pixel SPix constituting a pixel Pix; and FIG. 3(B) illustrates a configuration of a cross-section of the display part 20.

Each pixel Pix has three sub-pixels SPix corresponding to red (R), green (G), blue (B) respectively. Each of the sub-pixels SPix includes a TFT (Thin Film Transistor) element Tr, a liquid crystal element LC and a retentive capacity element Cs as shown in FIG. 3(A). TFT element Tr is made of, for example, a MOS-FET (Metal Oxide Semiconductor-Field Effect Transistor); the gate thereof is connected to a gate line GCL; the source is connected to a data line SGL; and the drain is connected to one end of the liquid crystal element LC and of the retentive capacity element Cs. One end of the liquid crystal element LC is connected to the drain of the TFT element Tr, and the other end thereof is grounded. One end of the retentive capacity element Cs is connected to the drain of the TFT element Tr, and the other end thereof is connected to a retentive capacity line CSL. The gate line GCL is connected to the gate driver 52; and the data line SGL is connected to the data driver 53.

Figure 3B:
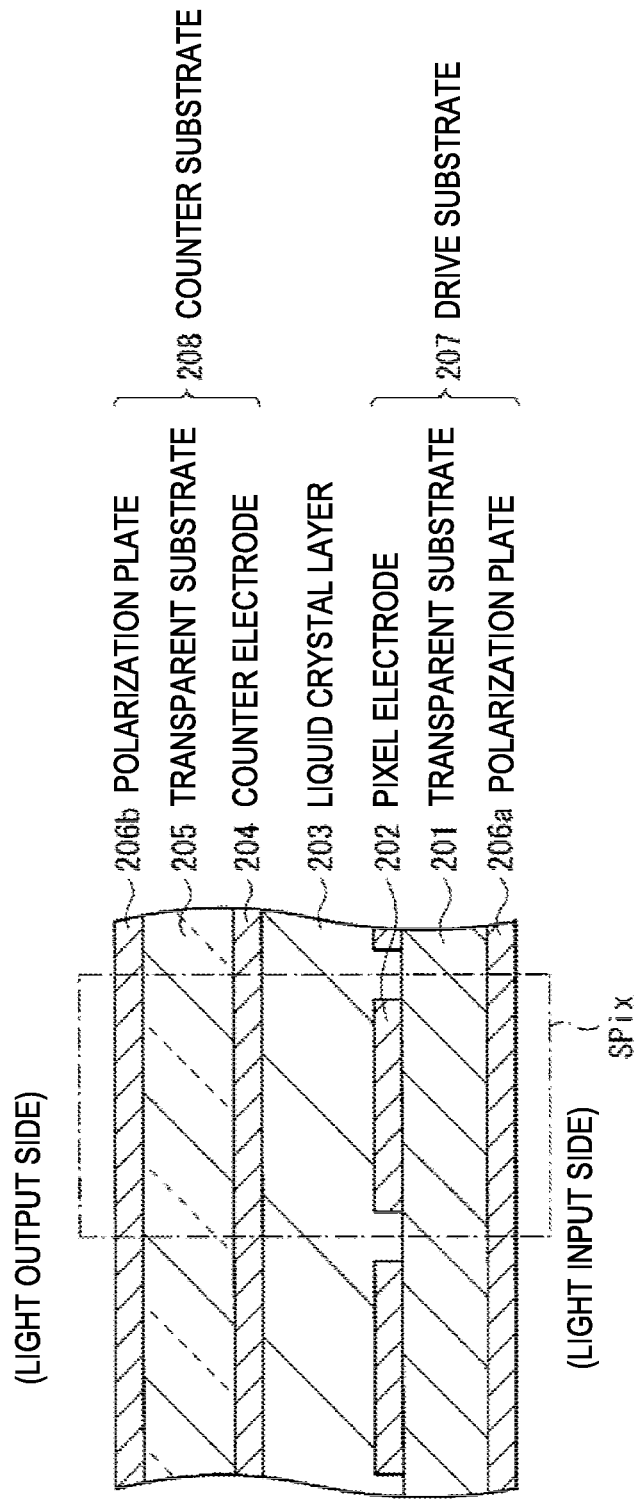
FIG. 3B is a cross-sectional view thereof.

The display part 20 is constituted of a drive substrate 207, a counter substrate 208 and a liquid crystal layer 203 sealed therebetween as shown in FIG. 3(B). The drive substrate 207 includes a transparent substrate 201, a pixel electrode 202 and a polarization plate 206*a*. The transparent substrate 201 is made of, for example, glass or the like formed with a TFT element Tr. On the transparent substrate 201, a pixel electrode 202 is disposed for each sub-pixel SPix. On the surface opposite to the surface disposed with the pixel electrode 202 of the transparent substrate 201, the polarization plate 206*a* is stuck. The counter substrate 208 includes a transparent substrate 205, a counter electrode 204 and a polarization plate 206*b*. The transparent substrate 205 is made of, for example, glass or the like. On the surface at the liquid crystal layer 203 side of the transparent substrate 205, a color filter and a black matrix are formed; and further thereon, the counter electrode 204 is disposed as a common electrode for the sub-pixels SPix. On the surface of the transparent substrate 205 opposite to the surface disposed with the counter electrode 204, the polarization plate 206*b* is stuck. The polarization plate 206*a* and the polarization plate 206*b* are stuck to each other so as to be crossed Nichol prism or parallel polarizer.

Figure 4:
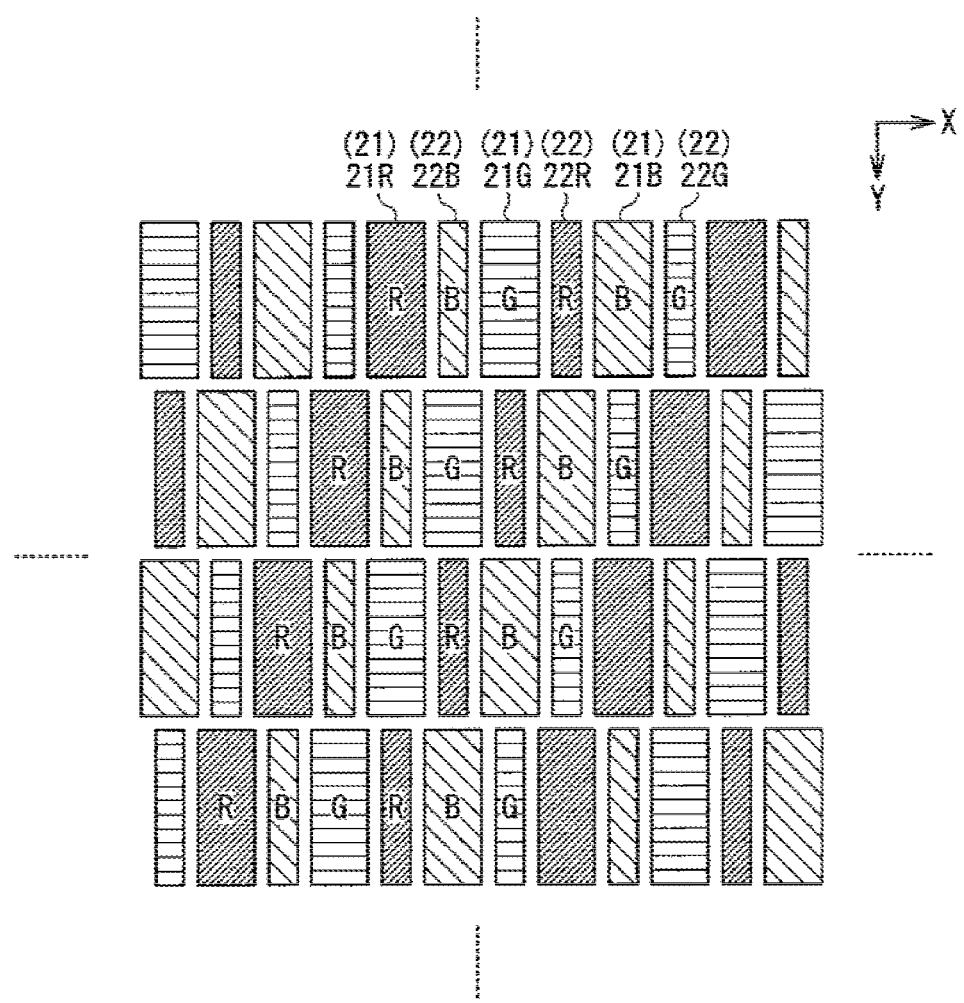
FIG. 4 is a plan view illustrating an example of the configuration of the display part shown in FIG. 1.

FIG. 4 illustrates an array of sub-pixels SPix in the display part 20. In FIG. 4, "R" represents a red sub-pixel SPix; "G" represents a green sub-pixel SPix; and "B" represents a blue sub-pixel SPix.

The display part 20 includes two different sub-pixels SPix (21, 22) each extending in a vertical direction Y and each different in width in the horizontal direction X of the display screen. In particular, the display part 20 includes sub-pixels 21 (21R, 21G, 21B) which have a larger width W21 in the horizontal direction X, and sub-pixels 22 (22R, 22G, 22B) which have a smaller width W22 in the horizontal direction X. The sub-pixels 21 and sub-pixels 22 are disposed alternately in the horizontal direction X. In particular, in this example, sub-pixels 21R, 22B, 21G, 22R, 21B and 22G are repeatedly disposed in the horizontal direction X in this order. Also, the sub-pixel 21 and the sub-pixel 22 are disposed alternately in the vertical direction Y of the display screen. The sub-pixel 21 and the sub-pixel 22 neighboring on each other in the vertical direction Y are arranged so that the central coordinates thereof coincide with each other in the horizontal direction X. In the boundary area between the neighboring sub-pixels 21 and 22, a black matrix (not shown) is formed to prevent color mixture among red (R), green (G) and blue (B).

Figure 5:
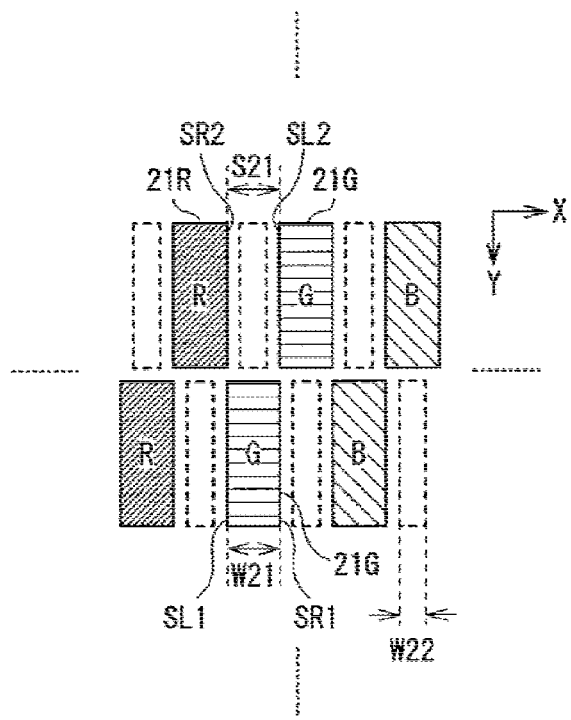
FIG. 5 illustrates a detailed disposition of the sub-pixels shown in FIG. 4.

FIG. 5 illustrates more precisely the disposition of the sub-pixels 21 in the display part 20. In the display part 20, the distance S21 between the neighboring sub-pixels 21 in the horizontal direction X is arranged to be equal to a width W21 of the sub-pixels 21 itself. With this arrangement, for example, the coordinate of the right edge (for example, right edge SR1) in the horizontal direction X of a sub-pixel 21 is arranged to be equal to the coordinate in the horizontal direction X of the left edge (for example, left edge SL2) of the sub-pixel 21 which is disposed neighboring at right upper. And for example, the coordinate in the horizontal direction X of the left edge (for example, left edge SL1) of a sub-pixel 21 is arranged to be equal to the coordinate of the right edge (right edge SR2) in the horizontal direction X of the sub-pixel 21 which is disposed neighboring at the left upper.

With this arrangement, when the 3D display device 1 performs a 3D display, which will be described later, the sub-pixels 21 display four viewpoint images, and the sub-pixel 22 displays a black color. When the 3D display device 1 performs an ordinary display (2D display), both of the sub-pixel 21 and the sub-pixel 22 displays a two dimensional image. With this, when the 3D display device 1 performs the 3D display, which will be described later, moire and crosstalk are reduced resulting in a enhanced image quality; and when the ordinary display is made, the image quality is enhanced by increased brightness.

(Barrier Part 10)

Figure 6A:
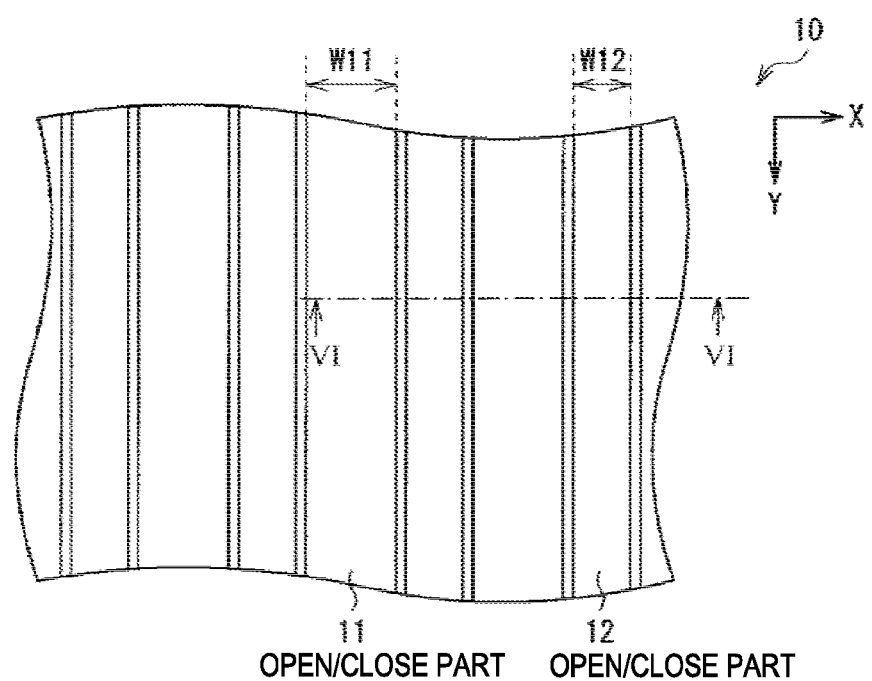
FIG. 6A is a plan view illustrating an example of the configuration of the barrier part shown in FIG. 1.

FIG. 6 illustrates an example of a configuration of the barrier part 10; FIG. 6A is a plan view of the barrier part 10, and FIG. 6B shows a cross-sectional configuration of the barrier part 10 taken along a line VI-VI as viewed in a direction of arrows.

The barrier part 10 is so-called a parallax barrier including multiple open/close parts (liquid crystal barrier) 11 and 12, which are light-transmissive or block the light as shown in FIG. 6A. In this example, the open/close parts 11 and 12 are provided extending in the vertical direction Y. In this example, the width W11 of the open/close part 11 and the width W12 of the open/close part 12 are different from each other; in this case, for example, W11>W12. However, the width relationship of the open/close parts 11 and 12 is not limited to this; it may be W11<W12 or W11=W12.

The barrier part 10 includes a drive substrate 107, a counter substrate 108 and a liquid crystal layer 103 sealed therebetween as shown in FIG. 6B. The drive substrate 107 includes a transparent substrate 101, a transparent electrode layer 102 and a polarization plate 106*a*. The transparent substrate 101 is made of, for example, glass or the like, and the transparent electrode layer 102 is formed thereon. On the surface opposite to the surface which is disposed with the transparent electrode layer 102 of transparent substrate 101, the polarization plate 106*a* is stuck thereto. The counter substrate 108 includes a transparent substrate 105, a transparent electrode layer 104 and a polarization plate 106*b*. The transparent substrate 105 is made of, for example, glass or the like, and the transparent electrode layer 104 is formed thereon. On the surface opposite to the surface which is disposed with the transparent electrode layer 104 of the transparent substrate 105, the polarization plate 106*b* is stuck thereto. The polarization plate 106*a* and polarization plate 106*b* are stuck with respect to each other so as to form crossed Nichol prism or parallel polarizer.

The transparent electrode layer 102 has multiple transparent electrodes 110 and 120. The transparent electrode layer 104 is provided as so-called a common electrode over the positions corresponding to the multiple transparent electrodes 110 and 120. Each of the open/close part 11 is configured including the transparent electrode 110 and the portions corresponding to the transparent electrode 110 in the liquid crystal layer 103 and the transparent electrode layer 104. Likewise, the open/close part 12 is configured including the transparent electrode 120 and the portions corresponding to the transparent electrodes 120 in the liquid crystal layer 103 and transparent electrode layer 104. With this configuration, when a voltage is selectively applied to the transparent electrode 110 or transparent electrode 120, in the barrier part 10, the liquid crystal layer 103 has a liquid-crystal molecular orientation corresponding to the voltage; and thus, the open/close operation of the respective open/close parts 11 and 12 can be performed.

The open/close parts 11 and 12 perform different operations depending on the display mode that the 3D display device 1 performs; i.e., the ordinary display (2D display) or the 3D display. In particular, when the ordinary display is made the open/close part 11 gets into the open state (transmissive state); and when the 3D display is made, the open/ close part 11 gets into the closed state (blocking state) which will be described below. In both of the ordinary display mode and the 3D display mode, the open/close part 12 gets into open state (transmissive state).

Figure 7:
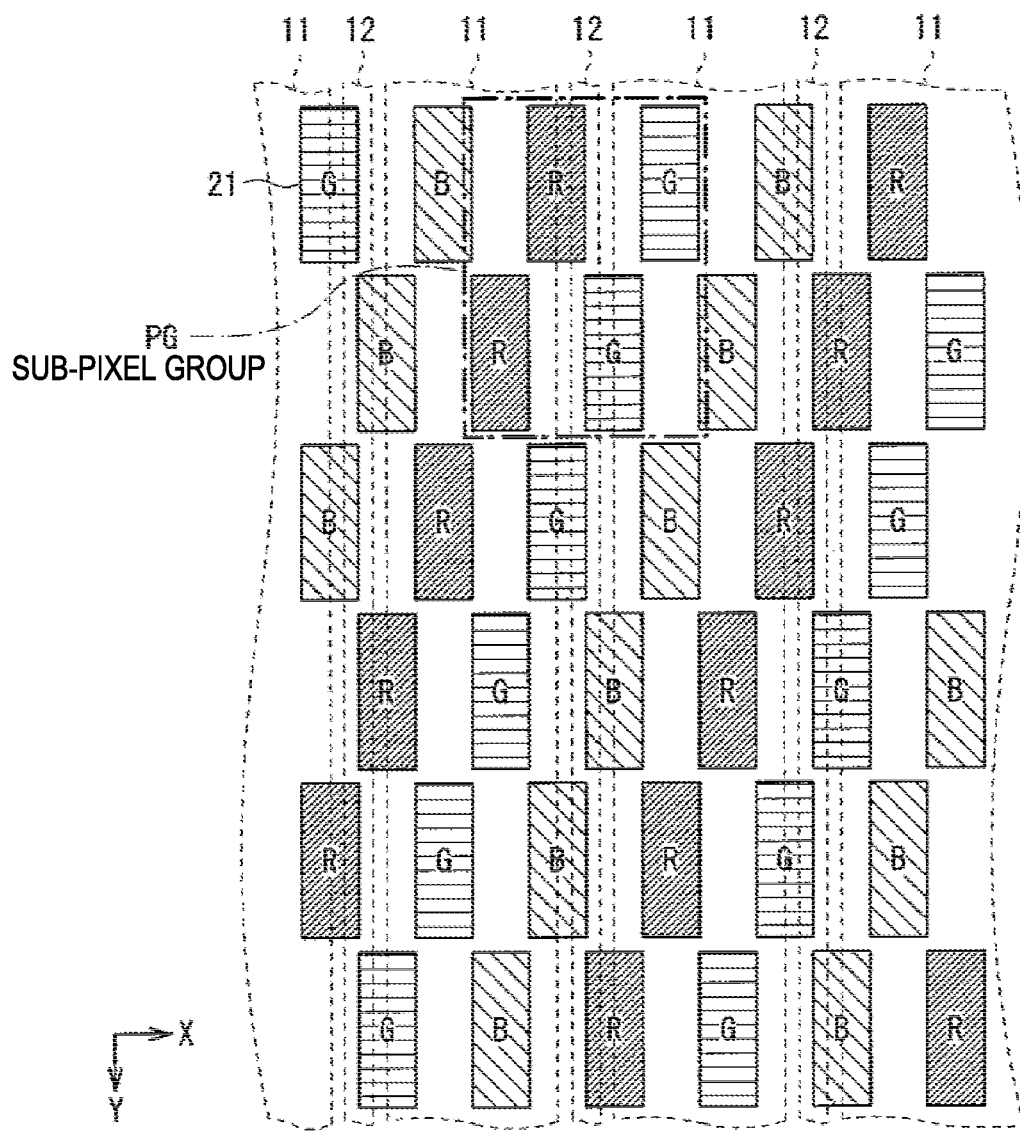
FIG. 7 illustrates a relationship between a barrier part and the display part shown in FIG. 1.

FIG. 7 illustrates a relative positional relationship in the display part 20 between the sub-pixels 21 and the open/close parts 11 and 12 in the barrier part 10. Note that the sub-pixels 22 in the display part 20 are omitted in the figure in FIG. 7. That is, the sub-pixels 22, which display a black color when the 3D display is performed, are omitted in FIG. 7. Within neighboring two lines, one open/close part 12 is provided for four sub-pixels 21 (sub-pixel group PG) in the horizontal direction X. This corresponds to the fact that, when the 3D display device 1 performs the 3D display, four viewpoint images are displayed.

Figure 8A:
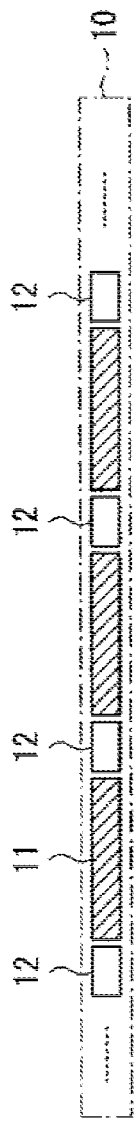
FIG. 8 is a schematic view illustrating a relationship between the barrier part and the display part shown in FIG. 1.
Figure 8B:
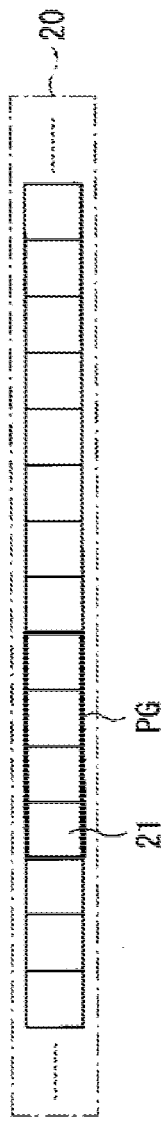

FIG. 8 schematically illustrates the state of the barrier part 10 in a cross-sectional structure when the 3D display and the ordinary display (2D display) are made. FIG. 8A shows a state when the 3D display is made; and FIG. 8B shows a state when the ordinary display is made. In FIG. 8, the open/close parts 11 marked with slashes represent the state that the light is blocked.

When the 3D display is made, an image signal S3D is supplied to the display drive section 50, and the display part 20 performs the display based on the image signal S3D. In particular, as show in FIG. 8A, in the barrier part 10, the open/close parts 12 get in the open state (transmissive state); and the open/close parts 11 get into the closed state (blocking state). In the display part 20, the neighboring four sub-pixels 21 (sub-pixel group PG) disposed at the positions corresponding to the open/close part 12 displays four piece of sub-pixel information P1-P4 each corresponding to the viewpoint images; and every sub-pixel 22 (not shown) performs the black display. With this arrangement, the viewer views viewpoint images which are different from each other on the left eye and the right eye as described later; i.e., stereoscopic image.

When the ordinary display (2D display) is made, an image signal S2D is supplied to the display drive section 50, and the display part 20 performs the display based on the image signal S2D. In particular, in the barrier part 10, both of the open/close parts 11 and 12 get into the open state (transmissive state); and in the display part 20, every sub-pixels 21 and 22 display one viewpoint image (two dimensional image) as shown in FIG. 8B. With this, the viewer views an ordinary two dimensional image displayed on the display part 20 as it is.

Here, the sub-pixels 21 (21R, 21G, 21B) correspond to a particular example of "first series pixels" according to an embodiment of the present disclosure; while the sub-pixels 22 (22R, 22G, 22B) correspond to a particular example of "second series pixels" according to an embodiment of the present disclosure. The open/close part 12 corresponds to a particular example of "liquid crystal barrier in first series" according to an embodiment of the present disclosure; and the open/close part 11 corresponds to a particular example of a "liquid crystal barrier in second series" according to an embodiment of the present disclosure.

[Operation and Working]

Subsequently, the operation and working of the 3D display device 1 of the embodiment will be described below.

(Entire Outline of the Operation)

Referring to FIG. 1, entire outline of the operation of the 3D display device 1 will be described first. The control section 41 controls the back light drive section 42, the display drive section 50 and the barrier drive section 43 based on the image signal Sdisp which is supplied from the external. The back light drive section 42 drives the back light 30 based on a back light control signal supplied from the control section 41. The back light 30 outputs the emitted light from the surface thereof to the display part 20. The display drive section 50 drives the display part 20 based on the image signal Sdisp2 supplied from the control section 41. The display part 20 modulates the light output from the back light 30 to perform the display. In particular, when performing the 3D display, the sub-pixels 21 on the display part 20 display the pixel information relevant to the four viewpoint images, and the sub-pixels 22 perform the black display. When performing the ordinary display (2D display), the sub-pixels 21 and 22 display a pixel information according to one viewpoint image (two dimensional image). The barrier drive section 43 controls the barrier part 10 based on the barrier control signal supplied from the control section 41. The open/close parts 11 and 12 in the barrier part 10 performs the open/close operation based on an instruction from the barrier drive section 43 to allow the light, which is output from the back light 30 and passes through the display part 20, to pass therethrough or block the same.

(Detailed Operation of the 3D Display)

The operation for performing the 3D display will be described in detail.

FIG. 9 illustrates an example of 3D display operation in the display part 20 and the barrier part 10. When the 3D display is performed, in the barrier part 10, the open/close parts 12 get into the open state (transmissive state); and the open/close parts 11 gets into the closed state (blocking state). The display part 20 displays the pixel information of the image signal S3D. At this time, the four sub-pixels 21 (sub-pixel group PG) disposed adjacent to the open/close part 12 display the pixel information P1-P4 corresponding to four viewpoint images respectively as shown in FIG. 9. The respective beams of light output from each of the sub-pixels 21 in the display part 20 are output with an angle restricted by the open/close part 12. With this, the viewer views, for example, the pixel information P2 with the left eye, and the pixel information P3 with the right eye. Thus, the viewer views different pieces of pixel information in the pixel information P1-P4 with the left eye and the right eye. Accordingly, the viewer senses the displayed image as a stereoscopic image.

(Image Quality)

Subsequently, a description is made on the image quality of the 3D display device 1. The description is made on the image quality of the 3D display, and then on the image quality of the ordinary display.

First, a description is made on the moire and the crosstalk in the 3D display.

FIG. 10A-FIG. 10C illustrate relative positional relationship between the sub-pixels 21 in the display part 20 and the open/close parts 12 in the barrier part 10. Note that the open/close parts 11 and the sub-pixels 22 are omitted in these figures. That is, in these figures, the open/close parts 12 which get into the open state when the 3D display is made and the sub-pixels 21 that display the image are illustrated; but the open/close parts 11 that get into the closed state when the 3D display is made and the sub-pixels 22 that display black color are omitted. The positional relationship shown in FIG. 10A-FIG. 10C is caused by, for example, a viewing angle when the viewer views the display screen. In particular, for example, when the viewer views from the front side perpendicular to the display screen, the positional relationship shown in FIG. 10B is obtained; when the viewer views from at the right side with respect to the front side perpendicular to the display screen, the positional relationship shown in FIG. 10A is obtained; and when the viewer views from at the left side with respect to the front side perpendicular to the display screen, the positional relationship shown in FIG. 10C is obtained.

For example, in the positional relationship shown in FIG. 10A, the viewer views a portion A1 in the sub-pixels 21G corresponding to an open/close part 12 in the open state. In the positional relationship shown in FIG. 10B, the viewer views portions A21 and A22 corresponding to the open/close part 12 in two sub-pixels 21G. Also in the positional relationship shown in FIG. 10C, the viewer views a portion A3 corresponding to an open/close part 12 in the open state in the sub-pixels 21G. At this time, in the 3D display device 1, since the sub-pixels 21 are disposed so that distance S21 in the horizontal direction X is equal to the width W21 between the sub-pixels 21 as shown in FIG. 5, the area of the portion A1 in FIG. 10A, the total area of the portions A21 and A22 in FIG. 10B and the area of the portion A3 in FIG. 10C are equal to each other. That is, the area of the viewed sub-pixel is constant regardless of the viewing angle α when the viewer views the display screen. With this, since the 3D display device 1 maintains the brightness at a substantially constant level regardless of the viewing angle α, the generation of moire is suppressed; and thus and the deterioration of the image quality is suppressed different from the case of comparative example, which will be described later.

Also, for example, the relative positional relationship between the sub-pixels 21 and 22 and the open/close part 12 may displace from a desired positional relationship due to the differences of manufacturing conditions or the like, and there may be a case that the states shown in FIG. 10A-FIG. 10C cyclically appear on the display screen. However, even in such case, the 3D display device 1, in the states shown in FIG. 10A-FIG. 10C, since the brightness is equal to each other, the brightness on the display screen is maintained uniformly.

Figure 11:
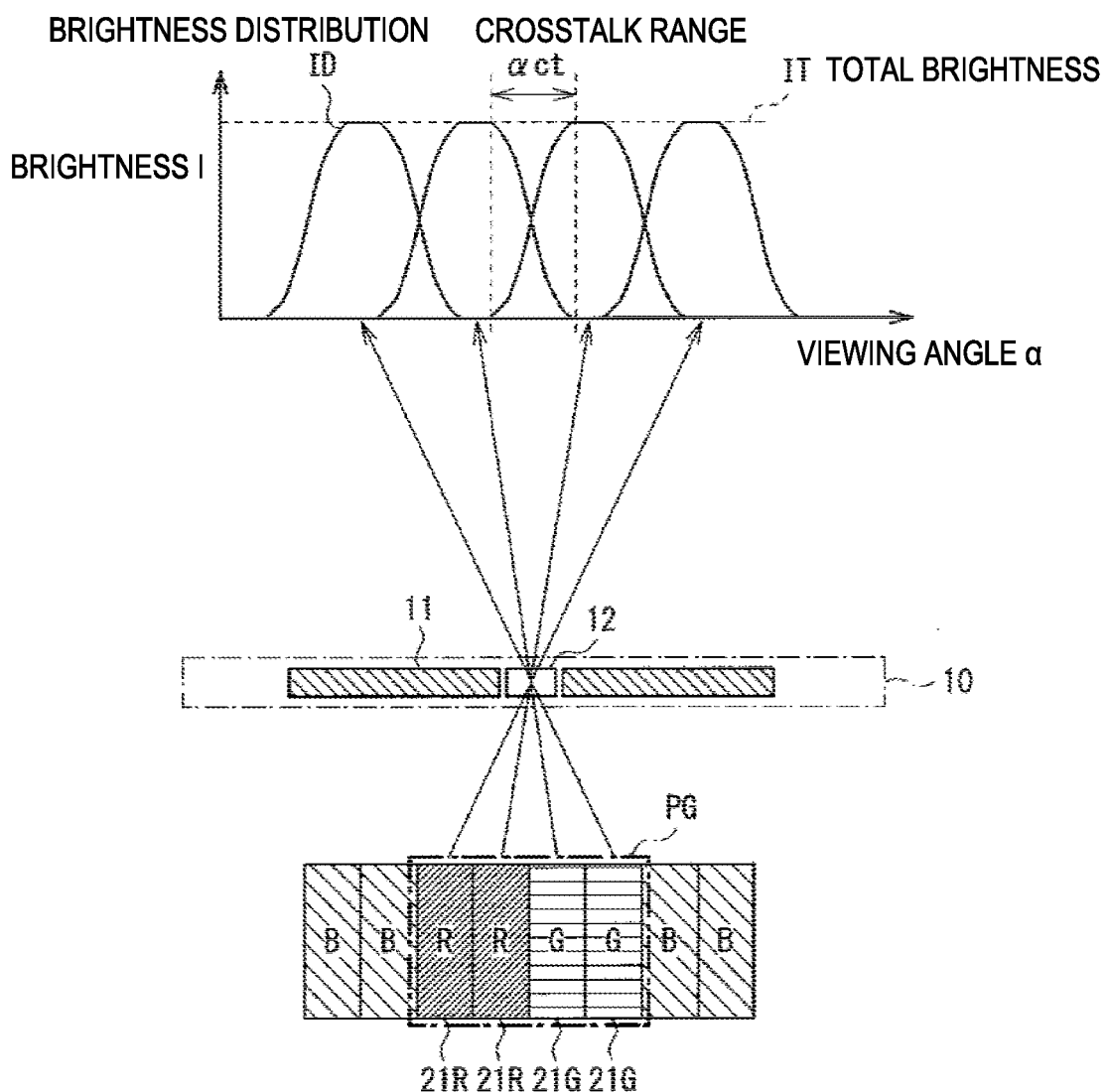
FIG. 11 is a schematic view showing an example of a brightness distribution in the 3D display device shown in FIG. 1.
Figure 12:
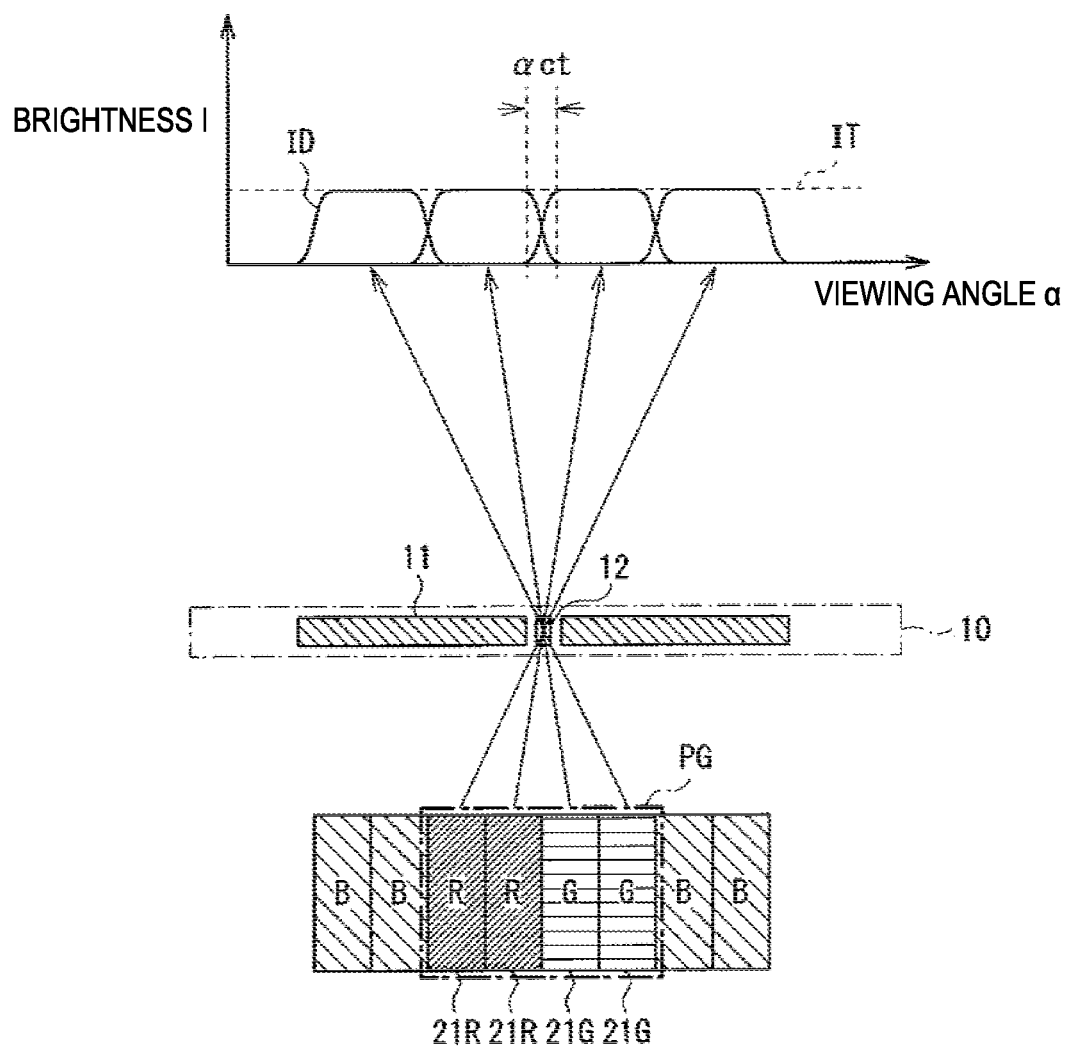
FIG. 12 is a schematic view showing another example of the brightness distribution in the 3D display device shown in FIG. 1.

FIGS. 11 and 12 schematically illustrate the brightness distribution relevant to a sub-pixel group PG FIG. 11 illustrates a case when the width W12 of the open/close parts 12 is large; and FIG. 12 illustrates a case when the width W12 of the open/close parts 12 is small.

Multiple light beams relevant to four viewpoint images, which are different from each other are output from each sub-pixel (in this example, two sub-pixels 21R and two sub-pixels 21G) in the sub-pixel group PG, and each of the multiple light beams proceeds in the respective directions passing through the open/close part 12 in the open state resulting in a brightness distribution ID. The brightness distribution ID reflects the width W12 of the open/close part 12. That is, in the brightness distribution ID, the larger width W12 of the open/close part 12 (FIG. 11) obtains the brightness I higher than that of the smaller width W12 (FIG. 12). And the smaller width W11 of the open/close part 12 obtains the overlapped portion in the neighboring brightness distributions ID that is larger than that of the larger width W11 (FIG. 11).

The total brightness IT, which is the sum of the brightness distributions ID, becomes substantially constant regardless of the width W12 of the open/close part 12 and regardless of the viewing angle α as shown in FIG. 11 and FIG. 12, thus the generation of moire is suppressed. This agrees with the fact that the area of the viewed sub-pixel is substantially constant regardless of the viewing angle α as described referring to FIG. 10. That is, since this characteristic is caused from the disposition of the sub-pixels 21 as shown in FIG. 5, this characteristic is ensured regardless of the width W12 of the open/close part 12. In the 3D display device 1, since the total brightness IT has a flat characteristic with respect to the viewing brightness α regardless of the width W12 of the open/close part 12, the generation of moire is suppressed.

In a range where neighboring brightness distributions overlap with each other (crosstalk range αct), the beams of light relevant to the viewpoint images, which are different from each other, overlap with each other. When the viewer views the displayed image at a viewing angle α within the range, a crosstalk occurs, in which different viewpoint images are displayed being overlapped with each other. The crosstalk range αct can be made smaller by reducing the width W12 of the open/close part 12 as demonstrated in FIGS. 11 and 12. That is, different from a comparative example, which will be described later, in the 3D display device 1, the crosstalk can be reduced while suppressing the generation of moire by reducing the width W12 of the open/close part 12.

As described above, in the 3D display device 1, since the sub-pixels 21 and the sub-pixels 22 are disposed alternately in the horizontal direction X, the generation of moire can be suppressed regardless of the width W12 of the open/close part 12, and thus, the degree of designing freedom is enhanced. In particular, for example, to reduce the crosstalk, width W12 of the open/close part 12 is reduced; to enhance the brightness I, the width W12 of the open/close part 12 is increased.

Subsequently, a description will be made on the image quality in the ordinary display (2D display).

When performing the ordinary display, the 3D display device 1 controls the open/close parts 11 and 12 in the barrier part 10 to get into the open state (transmissive state), and the sub-pixels 21 and 22 in the display part 20 display a two dimensional image. That is, when performing the 3D display, only the sub-pixels 21 in the display part 20 display a viewpoint image and the sub-pixels 22 perform black display. When performing ordinary display, both of the sub-pixels 21 and 22 display the image. Compared to the case where the sub-pixels 22 are not provided, the 3D display device 1 enhances the brightness during the ordinary display. As described above, when performing the 3D display, the 3D display device 1 effectively utilizes the sub-pixels 22 performing the black display during the ordinary display; to thereby enhance the image quality.

Also, in the 3D display device 1, the sub-pixels 21 and 22 are repeatedly disposed like 21R, 22B, 21G, 22R, 21B and 22G in this order as shown in FIG. 4. The sub-pixels, which are relevant to the same color (for example, sub-pixels 21R, 22R), are disposed uniformly at the constant distance in the horizontal direction X. Compared to the case where, for example, the sub-pixels 21R, 22R are disposed being neighboring on each other, smooth display with little sensation of dots is achieved.

(Comparative Example)

While comparing with a comparative example, advantageous effects of the 3D display device 1 according to the present embodiment will be described below. A 3D display device 1R according to the comparative example is configured including a display part 60R in which the disposition of sub-pixels SPix is different from that of the present embodiment. Other configuration is identical to that of the present embodiment (FIG. 1 or the like).

Figure 13:
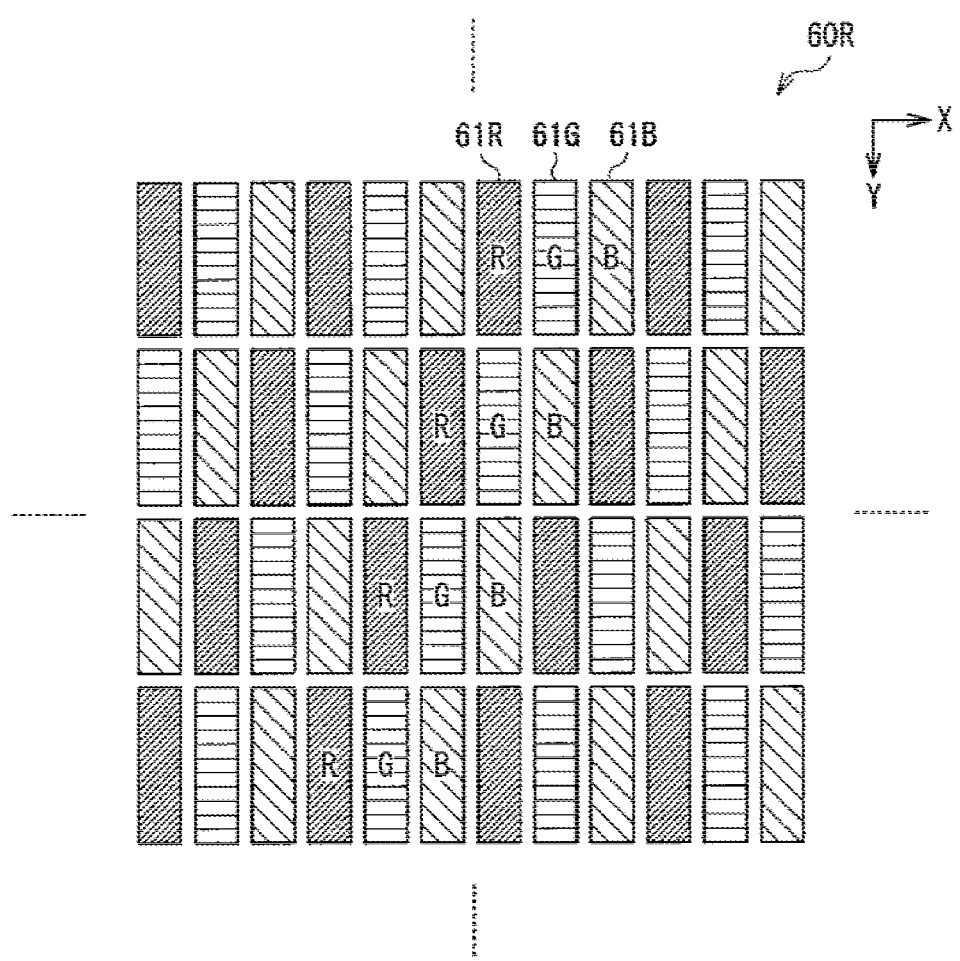
FIG. 13 is a plan view of an example of the configuration of a display part according to a comparative example.

FIG. 13 illustrates the array of sub-pixels SPix in the display part 60R. The display part 60R includes sub-pixels 61 (61R, 61G, 61B) each of which has an equal width in the horizontal direction X. That is, in the display part 20 according to the present embodiment, two different kinds of sub-pixels 21 and 22 each having a width different from each other are included. However, in the display part 60R according to the comparative example, the width of every sub-pixels of 61R, 61G and 61B is equal each other. The 3D display device 1R is configured so that every sub-pixel of 61R, 61G and 61B performs the display in both modes of the 3D display and the ordinary display (2D display).

Figure 14C:
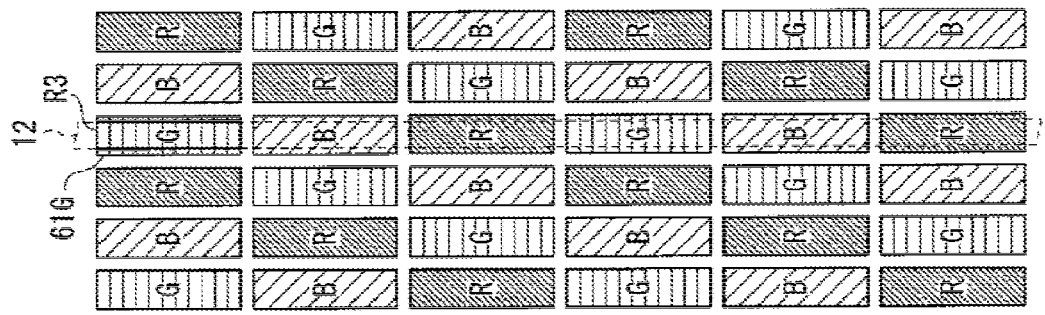
FIG. 14 illustrates a characteristic of a 3D display device according to a comparative example.
Figure 14B:
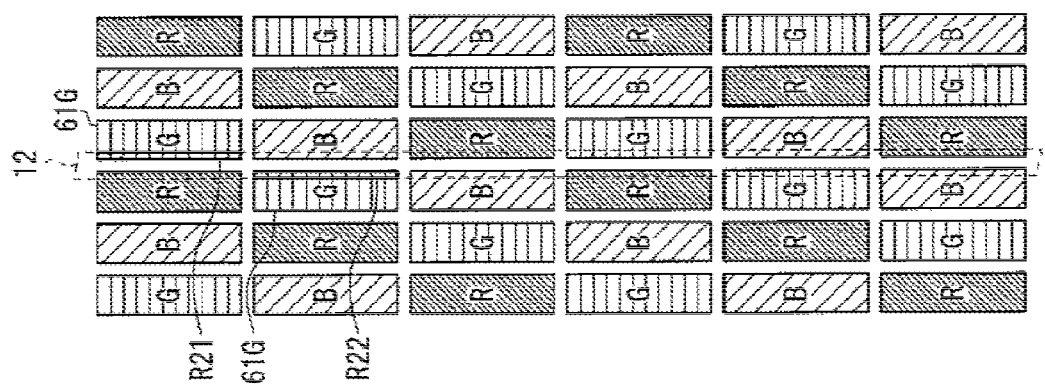
Figure 14A:
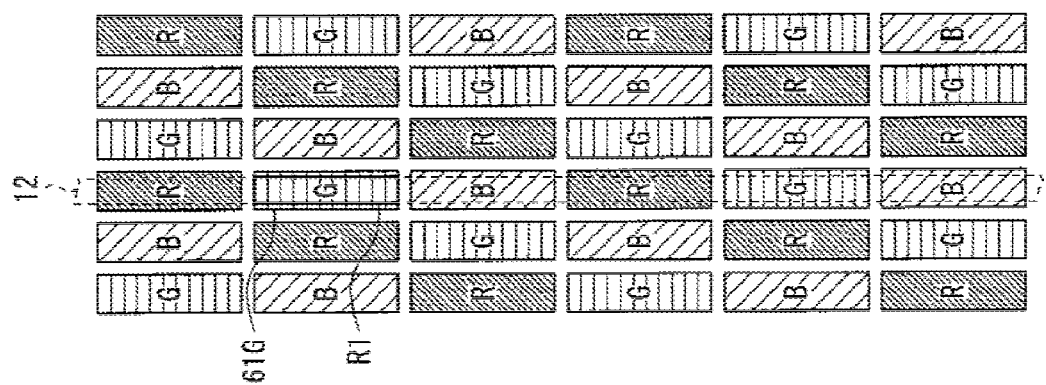

FIG. 14 illustrates a relative positional relationship between the sub-pixel 61 and the open/close part 12 in the 3D display device 1R. When the 3D display is performed, for example, in the positional relationship shown in FIG. 14A, the viewer views a portion R1 corresponding to the open/close part 12 in the open state in a sub-pixel 61G. In a positional relationship shown in FIG. 14B, the viewer views portions R21 and R22 corresponding to the open/close part 12 in certain two sub-pixels 61G. In a positional relationship shown in FIG. 14C, the viewer views a portion R3 corresponding to the open/close part 12 in a sub-pixel 61G. In this case, for example, the area of the portion R1 in FIG. 14A and the area of the portion R3 in FIG. 14C are larger than the total area of the portions R21 and R22 in FIG. 14B. In this example, in the positional relationships shown in FIG. 14A and FIG. 14C, compared to the positional relationship in FIG. 14B, the brightness of green is higher. Thus, in the 3D display device 1R, the brightness changes (moire) depending on a viewing angle α and the image quality may be deteriorated.

Also, for example, when the relative positional relationship between the sub-pixel 61 and the open/close part 12 is deviated from a desired positional relationship due to differences in manufacturing conditions, and when the states shown in FIG. 14A-FIG. 14C cyclically appear in the display screen, in the states in FIG. 14A-FIG. 14C, the brightness is different from each other, the viewer may view uneven brightness on the display screen and the image quality may be deteriorated.

Figure 15:
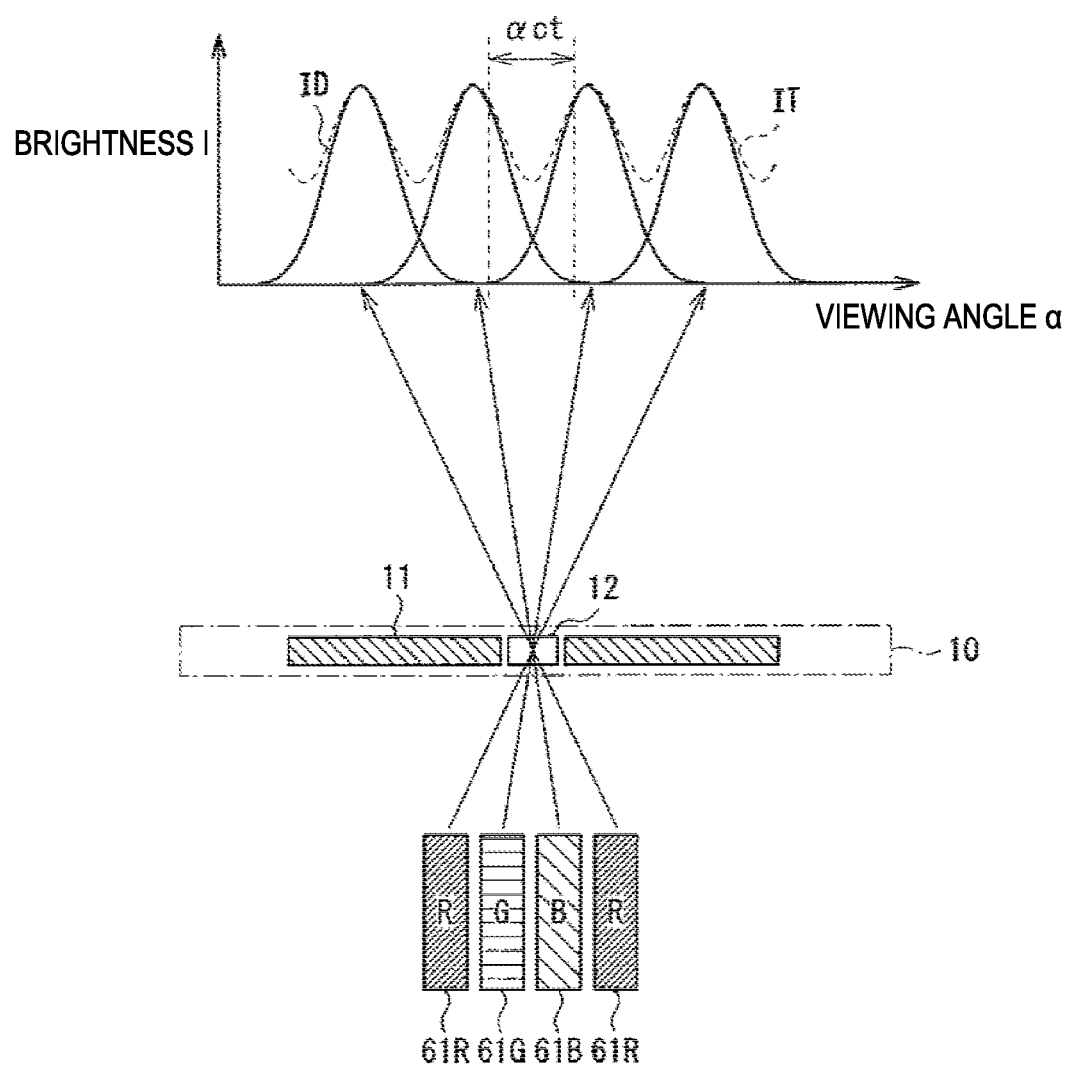
FIG. 15 is a schematic view illustrating an example of a brightness distribution in the 3D display device according to the comparative example.
Figure 16:
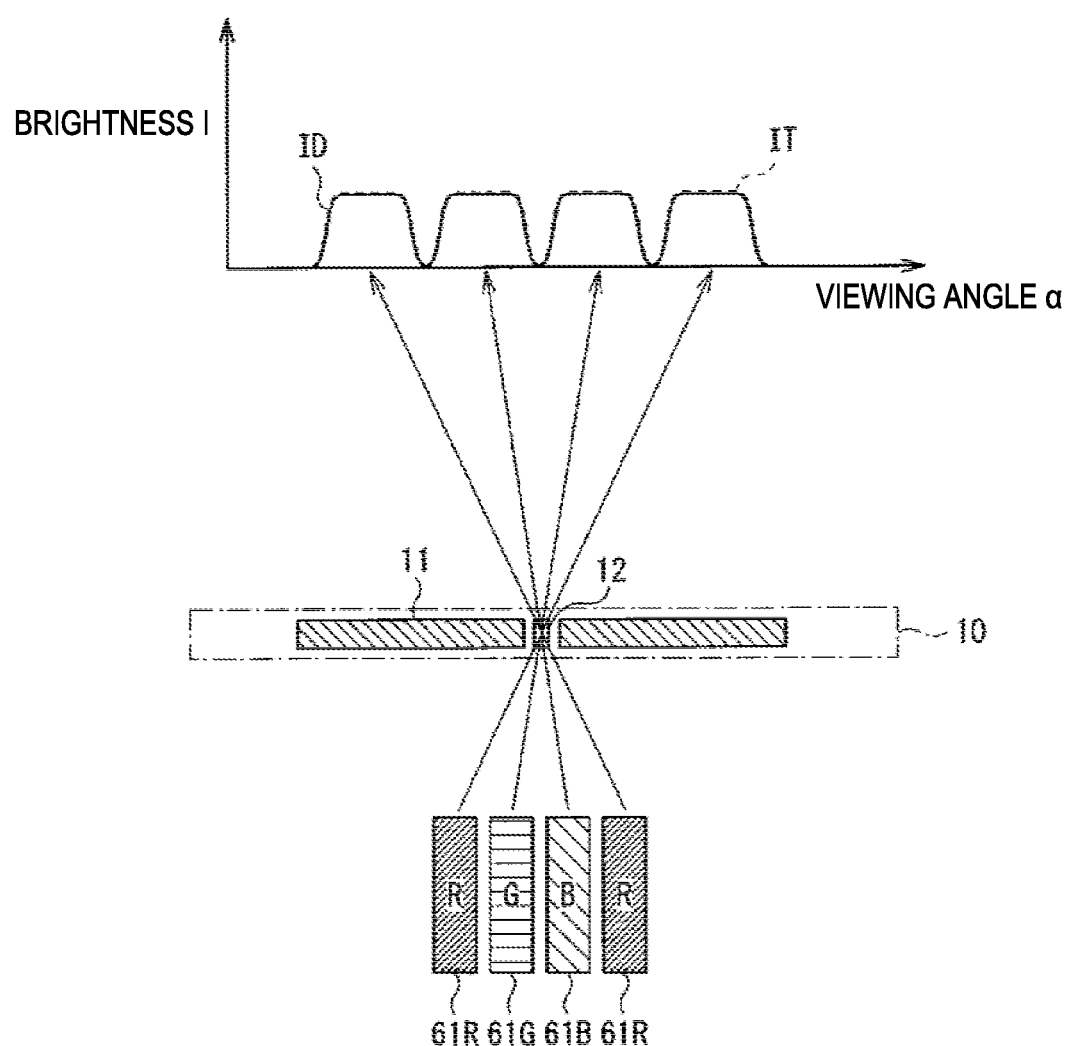
FIG. 16 is a schematic view illustrating another example of the brightness distribution in the 3D display device according to the comparative example.

FIGS. 15 and 16 schematically illustrate a brightness distribution relevant to a sub-pixel group PG in the 3D display device 1R. FIG. 15 illustrates the case where the width W12 of the open/close part 12 is larger. And FIG. 16 illustrates the case where the width W12 of the open/close part 12 is smaller.

The total brightness IT which is a sum of the respective brightness distributions ID changes depending on the viewing angle α as shown in FIGS. 15 and 16. This is caused from the fact that area of the viewed sub-pixel 61 changes depending on the viewing angle α as shown in FIG. 14. Particularly, when the width W12 of the open/close part 12 is made smaller as shown in FIG. 16, the total brightness IT largely changes depending on the viewing angle α. As describe above, in the 3D display device 1R, when the width W12 of the open/close part 12 is made smaller, the brightness I changes depending on the viewing angle α, and this may be recognized as a moire.

The crosstalk range αct can be reduced by reducing the width W12 of the open/close part 12 as shown in FIGS. 15 and 16. That is, same as the case of the 3D display device 1 according to the present embodiment, the crosstalk can be reduced by reducing the width W12 of the open/close part 12.

As described above, in the 3D display device 1R according to the comparative example, for example, when the width W12 of the open/close part 12 is made larger, although the moire on the display screen can be reduced, the crosstalk gets worse. Also, for example, when the width W12 of the open/close part 12 is made smaller, although the crosstalk can be reduced, the moire is generated. That is, in the 3D display device 1R, the moire and the crosstalk are in a relationship of trade-off. Therefore, both characteristics are hardly improved simultaneously.

On the other hand, in the 3D display device 1 according to the present embodiment, since the sub-pixel 21 and the sub-pixel 22 are disposed alternately in the horizontal direction X, generation of moire can be suppressed regardless of the width W12 of the open/close part 12. That is, in the 3D display device 1, the moire and the crosstalk are not in a relationship of trade-off. Therefore, the crosstalk can be reduced while suppressing the generation of moire by reducing the width W12 of the open/close part 12.

[Advantageous Effect]

As described above, according to the present embodiment, in addition to the sub-pixels 21, the sub-pixels 22 are provided. Therefore, the brightness in the ordinary display (2D display) can be enhanced resulting in an enhanced image quality.

Also, in the present embodiment, the distance between the sub-pixels 21 in the horizontal direction is arranged to be equal to the width of the sub-pixel 21 itself. Therefore, the generation of moire can be suppressed during performing the 3D display and the degree of designing freedom can be enhanced. In particular, for example, when the width of the open/close part 12 made smaller, the crosstalk can be reduced while suppressing the generation of moire.

[Modification 1-1]

In the above embodiment, the distance S21 between the sub-pixels 21 in the horizontal direction X is arranged to be equal to the width W21 of the sub-pixel 21 itself. However, the embodiment is not limited to this. Detailed descriptions will be made below.

Figure 17A:
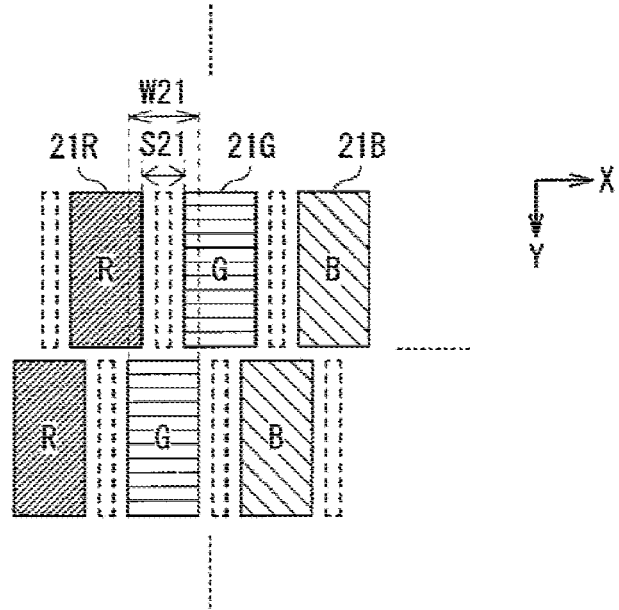
FIG. 17 is a plan view illustrating an example of the configuration of a display part according to a modification.
Figure 17B:
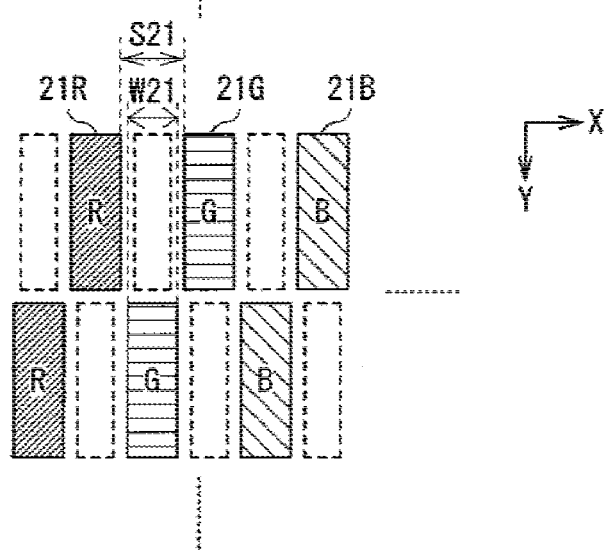

FIG. 17 illustrates the disposition of the sub-pixels 21 in the display part 20A according to the modification 1-1. FIG. 17A illustrates the case where the distance S21 between the sub-pixels 21 is smaller than the width W21. FIG. 17B illustrates the case where the distance S21 between the sub-pixels 21 is larger than the width W21. When the sub-pixels 21 are disposed as shown in FIG. 17, different from the case of the above-described embodiment (FIG. 10), the area of the viewed sub-pixel changes slightly depending on the viewing angle α when the viewer views the display screen. With this, for example, the smaller the width W12 of the open/close part 12, the fewer the crosstalk results in. However, the moire may be generated. That is, in the modification 1-1, although not so considerably large as the above-described comparative example, a relationship of trade-off is generated between the crosstalk and the moire. Therefore, in the modification 1-1, it is necessary to arrange the distance S21 between the sub-pixels 21 and the width W12 of the open/close part 12 within a range where the image quality is not deteriorated by the crosstalk and the moire.

A description will be made on the amount of the crosstalk and the moire under which the viewer does not recognize the decease of the image quality. A description is made first on acceptable amount of the crosstalk.

Figure 18:
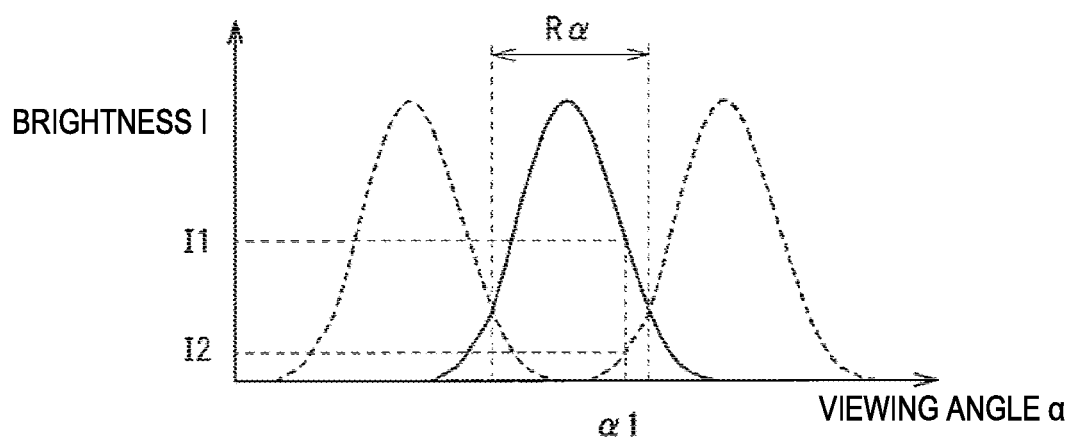
FIG. 18 illustrates a characteristic of the 3D display device.

FIG. 18 illustrates the brightness distribution of the neighboring multiple sub-pixels 21. In an area adjacent to the both sides of a viewing angle range Rα in which mainly the light from a sub-pixel 21 can be viewed, the light from a sub-pixel 21 neighboring on the sub-pixel 21 also viewed. In particular, for example, at the viewing angle α1, in addition to the light of brightness I1 from the desired sub-pixel 21, the light of brightness I2 from the neighboring sub-pixel 21 is also viewed. At this time, the crosstalk amount CT is expressed by the following formula:

$$CT = I2/I1 \times 100 \tag{1}$$

That is, the crosstalk amount CT is a value such that the larger influence from the neighboring sub-pixel 21 (the larger crosstalk), the larger value results in. Personal difference is found in recognition of the decease of image quality due to the crosstalk; and the sensation is different depending on the content of the displayed image. The crosstalk amount CT is preferred to be approximately 10% or less.

Subsequently, a description is made on acceptable amount of the moire. In the case when the sub-pixels 21 are disposed as shown in FIG. 17, the area of the viewed sub-pixel changes depending on the viewing angle α when the viewer views the display screen. Therefore, the brightness I changes depending on the viewing angle α. In particular, it is assumed that, for example, at a viewing angle α, the brightness I is maximum (brightness I3); and at another viewing angle α, the brightness I is minimum (brightness I4). At this time, the moire amount MO is expressed by the following formula:

$$MO=(1-I4/I3)\times 100 \qquad (2)$$

That is, the moire amount MO is a value such that the larger difference of the brightness I due to the viewing angle α results in the larger value. Personal difference is found also in the recognition of the image quality decease due to the moire. The moire amount MO is preferably approximately 30% or less.

Accordingly, when disposing the sub-pixels 21 as shown in FIG. 17, the sub-pixels 21 are preferably disposed so that the crosstalk amount CT is 10% or less; and the moire amount MO is 30% or less, for example.

[Modification 1-2]

In the above embodiment, it is arranged so that, when performing the 3D display, the sub-pixels 22 display the black color. The embodiment is not limited to this. Alternatively, for example, gray may be displayed. With this, compared to the case where sub-pixels 22 perform the black display, the brightness of the display screen can be enhanced during the 3D display.

In this case, the crosstalk amount CT also can be reduced. When the sub-pixels 22 display the gray, the crosstalk amount CT is expressed by the following formula:

$$CT=I2/(I1+IG)\times 100 \qquad (3)$$

Wherein, IG is a brightness of gray display. Thus, when the sub-pixels 22 performs the gray display, the crosstalk amount CT decreases. Thus, the possibility that the viewer recognizes the decease of the image quality due to the crosstalk can be reduced. In this case also, the brightness IG of the gray display may be set so that the crosstalk amount CT is, for example, 10% or less.

[Modification 1-3]

In the above embodiment, the open/close parts 11 and 12 are provided so as to extend in the vertical direction Y. However, the embodiment is not limited to this. Alternatively, for example, open/close parts 71A and 72A may be formed in a step-like configuration as a barrier part 70A shown in FIG. 19A. Or, open/close parts 71B and 72B may be formed so as to extend in an oblique direction as a barrier part 70B shown in FIG. 19B.

Figure 19A:
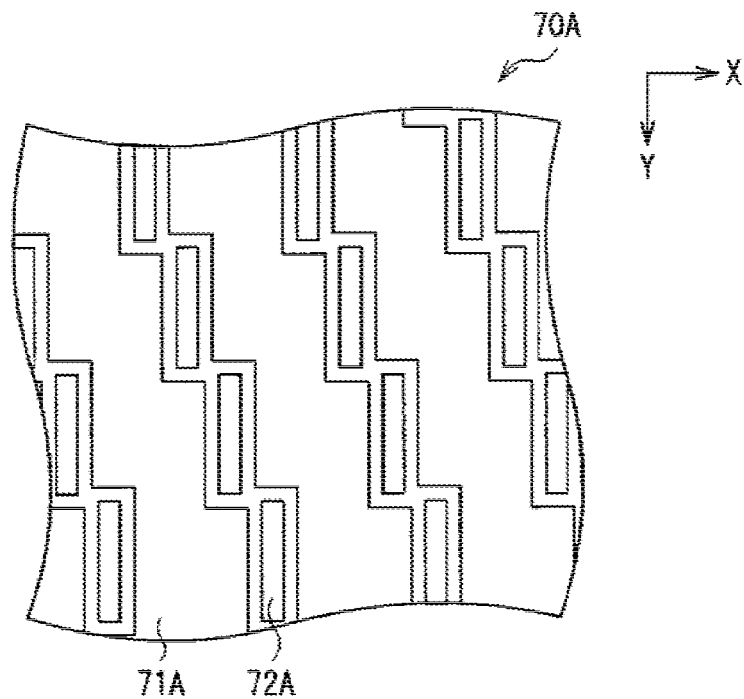
FIG. 19 is a plan view illustrating an example of the configuration of a barrier part according to another modification.
Figure 19B:
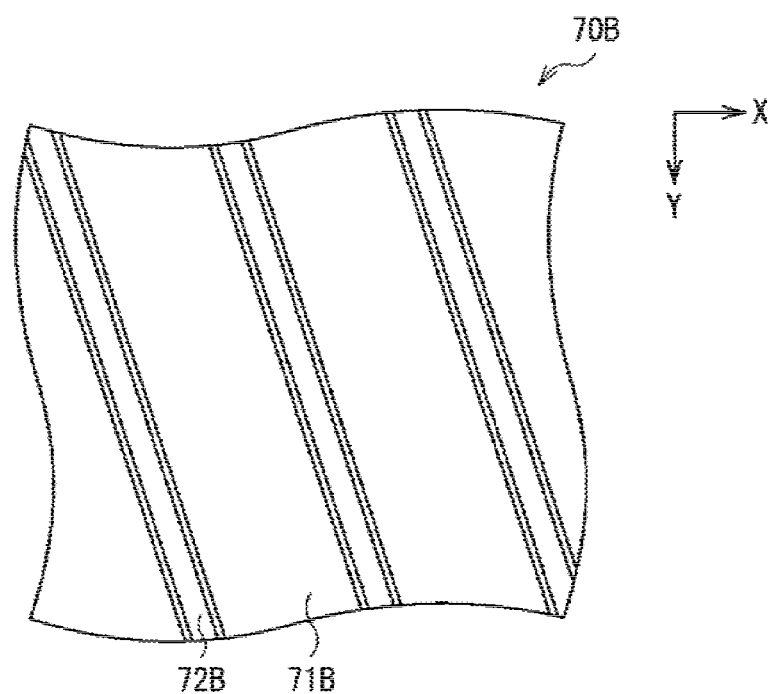
Figure 20:
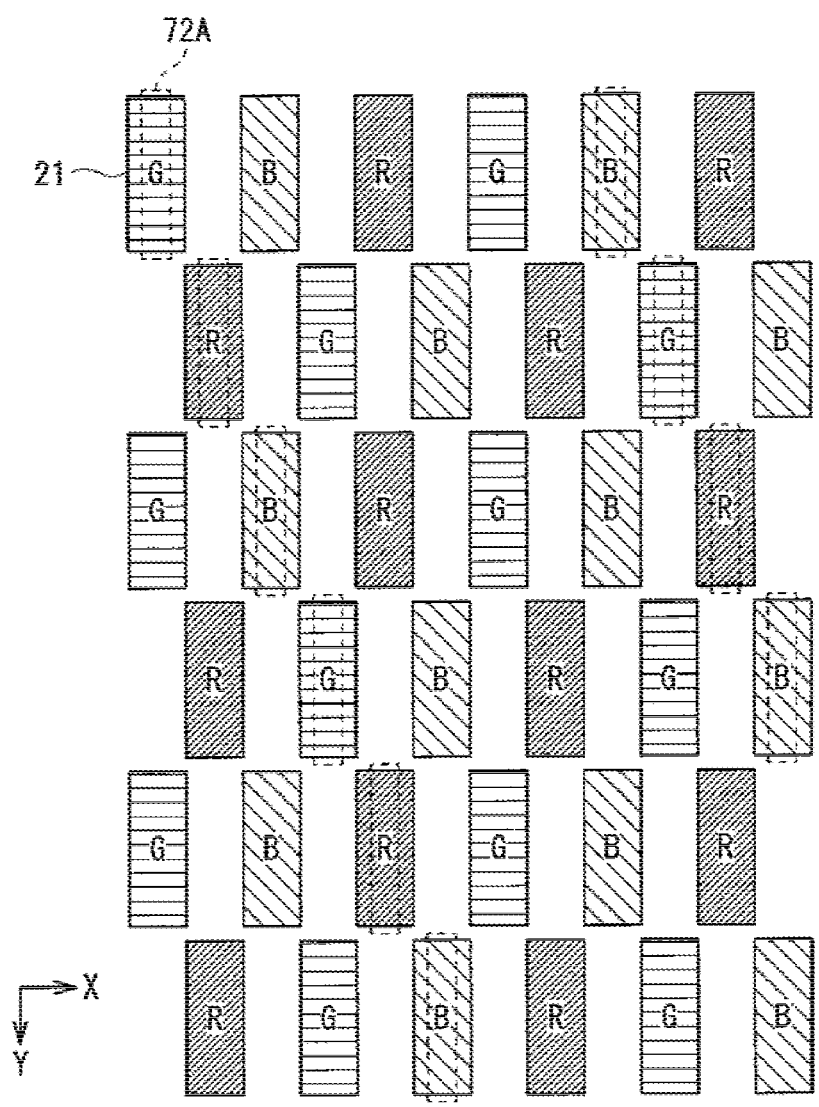
FIG. 20 illustrates a relationship between the barrier part and the display part according to another modification.

FIG. 20 illustrates a positional relationship between the sub-pixels 21 and the open/close part 72A in the case where barrier part 70A is used shown in FIG. 19A. Note that, the sub-pixels 22 and open/close part 72B are omitted in the figure. Receiving an identical control signal, these open/close parts 72A perform the open/close operation simultaneously. One open/close part 72A is provided for four sub-pixels 21 in the horizontal direction X. This agrees with a fact that the 3D display device according to the modification performs the 3D display by displaying four viewpoint images.

[Modification 1-4]

In the above embodiment, the sub-pixels 21 and 22 are formed to extend in the vertical direction Y. However, the embodiment is not limited to this. Alternatively, the sub-pixels 21 and 22 may be formed to extend, for example, in the horizontal direction X. Detailed description is made below on such modification.

Figure 21:
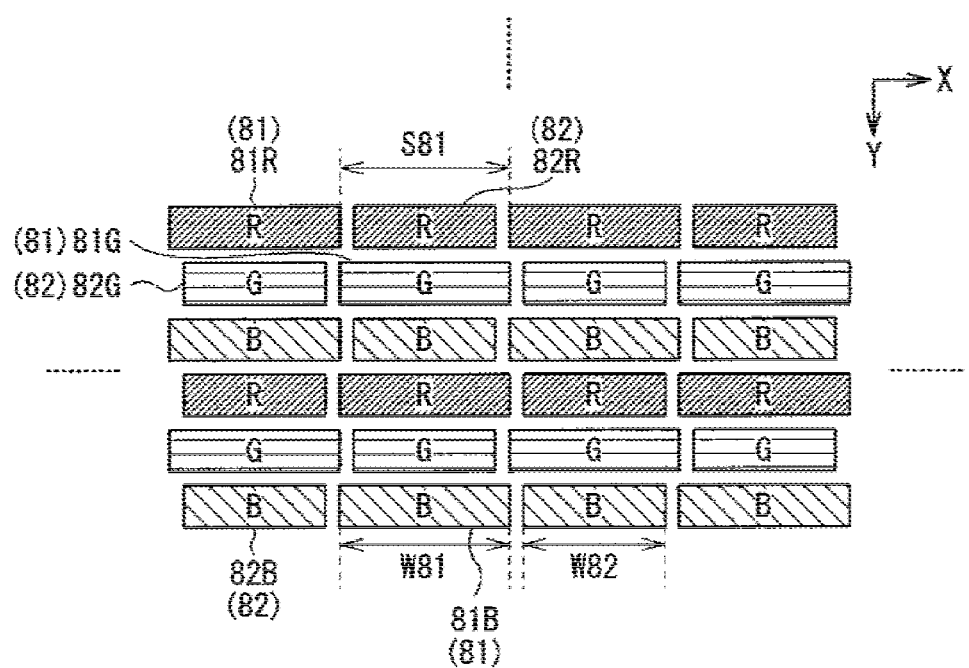
FIG. 21 is a plan view illustrating an example of the configuration of the display part according to another modification.

FIG. 21 illustrates an array of sub-pixels SPix in a display part 80 according to a modification. The display part 80 includes two different types of sub-pixels SPix (81 and 82) that extend in the horizontal direction X but the width in the horizontal direction X is different from each other. In particular, the display part 80 includes sub-pixels 81 (81R, 81G, 81B) that has a larger width (width W81) in the horizontal direction X and sub-pixels 82 (82R, 82G, 82B) that has a smaller width (width W82) in the horizontal direction X. The sub-pixels 81 and the sub-pixels 82 are disposed alternately in both of the horizontal direction X and the vertical direction Y. In particular, in this example, sub-pixels 81R, 82G, 81B, 82R, 81G, 82B are repeatedly dispose in the vertical direction Y in this order. In this case, the sub-pixels 81 and the sub-pixels 82 neighboring on each other in the vertical direction Y are arranged so as that the central coordinates thereof in the horizontal direction X coincide with each other. Also, in the horizontal direction X, the sub-pixels 81R and 82R are disposed alternately; the sub-pixel 81G and 82G are disposed alternately; and the sub-pixel 81B and 82B are disposed alternately. In the display part 80, the distance S81 between the sub-pixels 81 neighboring in the horizontal direction X is equal to the width W81 of the sub-pixel 81 itself. With this configure, when the display device according to the modification 1-4 performs the 3D display, the sub-pixel 81 displays four viewpoint images, and the sub-pixel 82 displays a black color. When performing the ordinary display (2D display), both of the sub-pixel 81 and the sub-pixel 82 display a two dimensional image.

Figure 22:
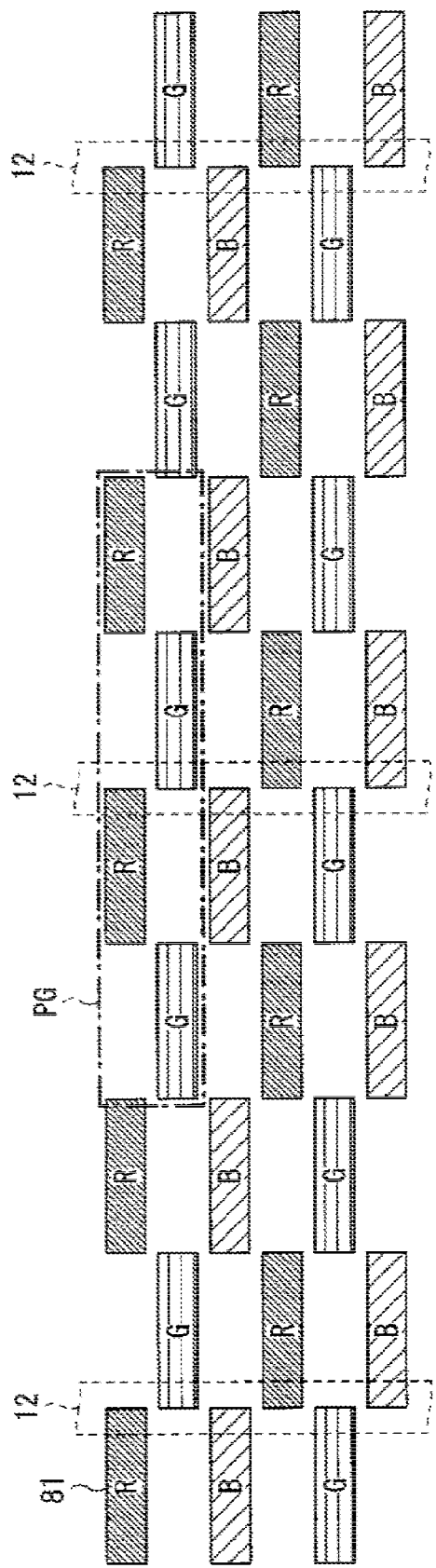
FIG. 22 illustrates a relationship between the barrier part and the display part according to another modification.

FIG. 22 illustrates a positional relationship between the sub-pixels 81 in the display part 80 and the open/close parts 12 in the barrier part 10. Note that the open/close part 11 and the sub-pixels 82 are omitted in this figure. One open/close part 12 is provided for four sub-pixels 81 (sub-pixel group PG) within two neighboring lines. This agrees with the fact that the 3D display device according to a modification displays four viewpoint images when performing the 3D display.

[Modification 1-5]

In the above embodiment, when performing the 3D display, the open/close part 12 is constantly maintained in the open state. However, the embodiment is not limited to this. Alternatively, for example, by dividing open/close part 12 into multiple groups, and the groups may be driven to open/close in a time-sharing manner. Detailed description is made below.

Figure 23:
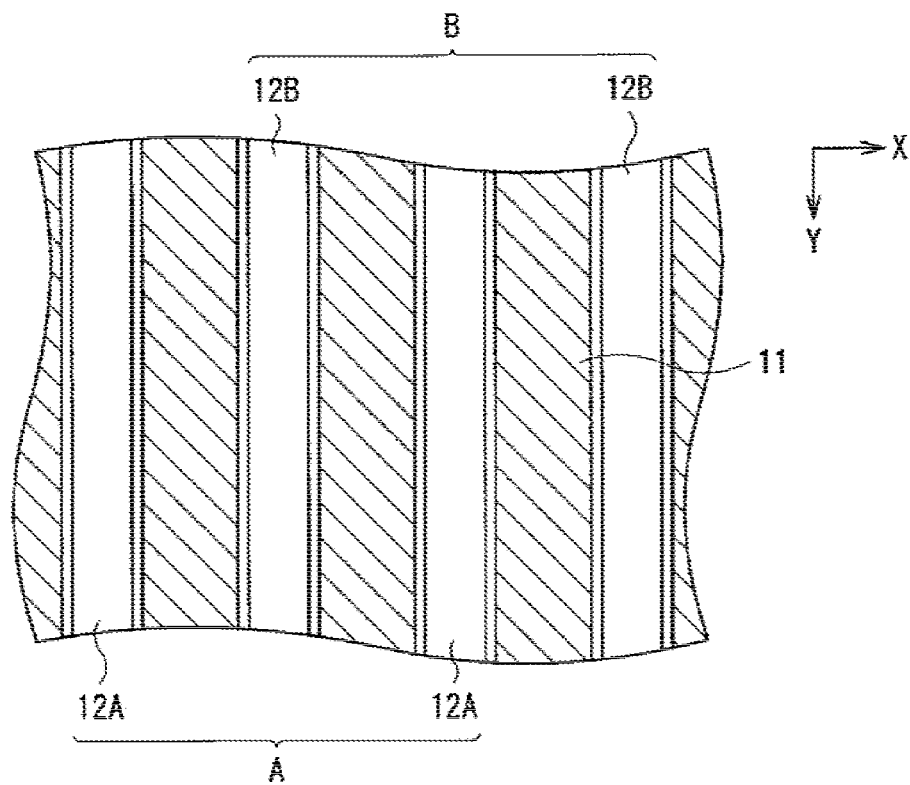
FIG. 23 is a plan view illustrating an example of the configuration of the barrier part according to another modification.

FIG. 23 illustrates an example of a group configuration of the open/close part 12. In this example, the open/close part 12 is divided into two groups; i.e., group-A and group-B. Open/close parts 12 included in the group-A and open/close parts 12 included in the group-B are disposed alternately being interposed by the open/close part 11. Hereinafter, the open/close parts 12 included in the group-A are appropriately referred to as open/close parts 12A as a collective designation; likewise, the open/close parts 12 included in the group-B are appropriately referred to as open/close parts 12B as a collective designation.

Figure 24A:
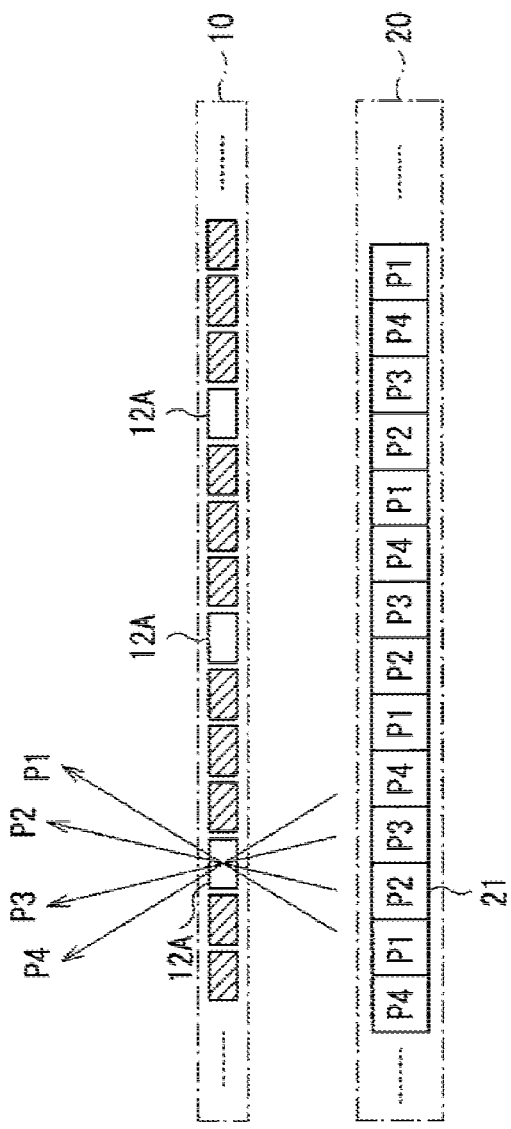
FIG. 24 is a schematic view illustrating a relationship between the barrier part and the display part according to another modification.
Figure 24B:
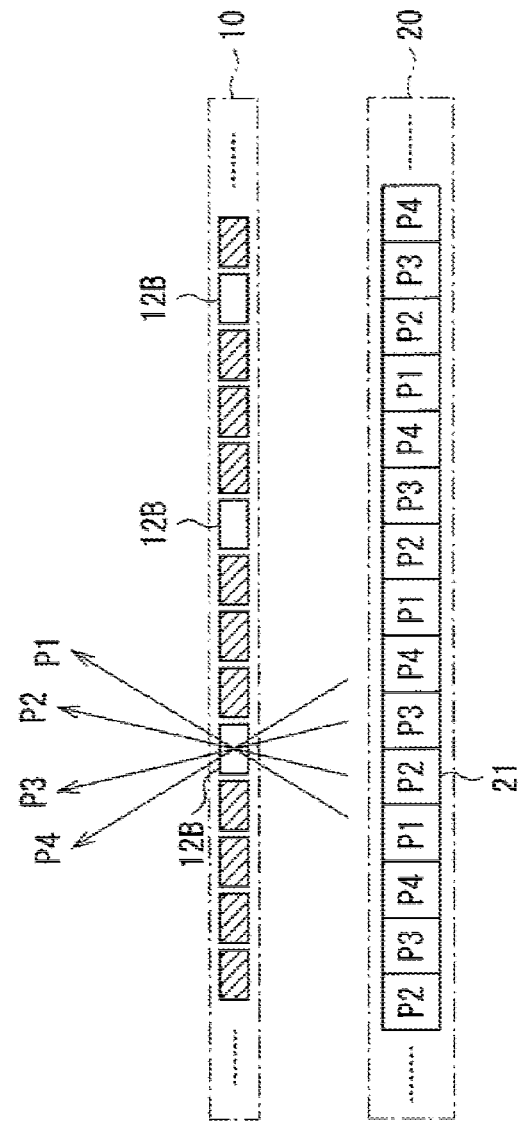

FIG. 24 illustrates an example of the operation of a 3D display device 1E according to a modification when performing the 3D display. FIG. 24A illustrates a first state; and FIG. 24B illustrates a second state. The 3D display device 1E performs the operation while switching between the first state and the second state alternately.

In the first state, each of the sub-pixels 21 in the display part 20 displays a piece of pixel information P1-P4 corresponding to four viewpoint images respectively as shown in FIG. 24A. At this time, the respective pieces of pixel information P1-P4 are displayed on the sub-pixels 21 disposed adjacent to the open/close part 12A. In the barrier part 10, the open/close part 12A gets into the open state (transmissive state); the open/close part 12B gets into the closed state. The respective light beams output from the respective sub-pixels 21 in the display part 20 are output at an angle regulated by the open/close part 12A. With this, the viewer views, for example, a piece of pixel information P2 with the left eye and a piece of pixel information P3 with the right eye; and thus, the viewer can view a stereoscopic image.

In the second state, each of the sub-pixels 21 in the display part 20 displays a piece of pixel information P1-P4 corresponding to the four viewpoint images as shown in FIG. 24B. At this time, the four pieces of pixel information P1-P4 are displayed on the sub-pixels 21 disposed adjacent the open/close part 12B. In the barrier part 10, the open/close part 12B gets into the open state (transmissive state), and the open/close part 12A gets into the closed state. The respective light beams output from each of the sub-pixels 21 in the display part 20 are output at an angle regulated by the open/close part 12B. With this, the viewer views, for example, a piece of pixel information P2 with the left eye, and a piece of pixel information P3 with the right eye; and thus, the viewer can view a stereoscopic image.

By displaying the image while causing the open/close part 12A and the open/close part 12B to open/close alternately in a time-sharing manner as described above, the viewer views images displayed at positions displaced from each other while averaging the images. The 3D display device 1E achieves a resolution two-times higher than that of the 3D display device 1 according to the above embodiment.

[Modification 1-6]

Figure 25:
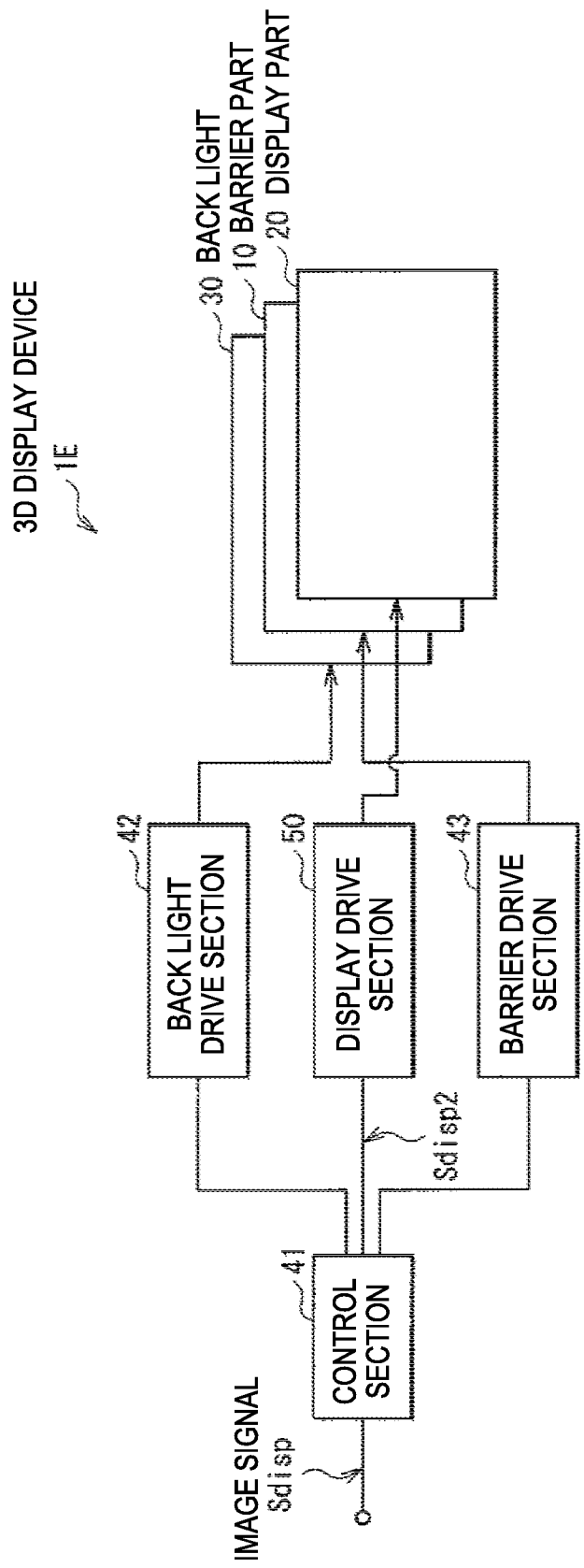
FIG. 25 is a block diagram illustrating an example of the configuration of the 3D display device according to another modification.
Figure 26:
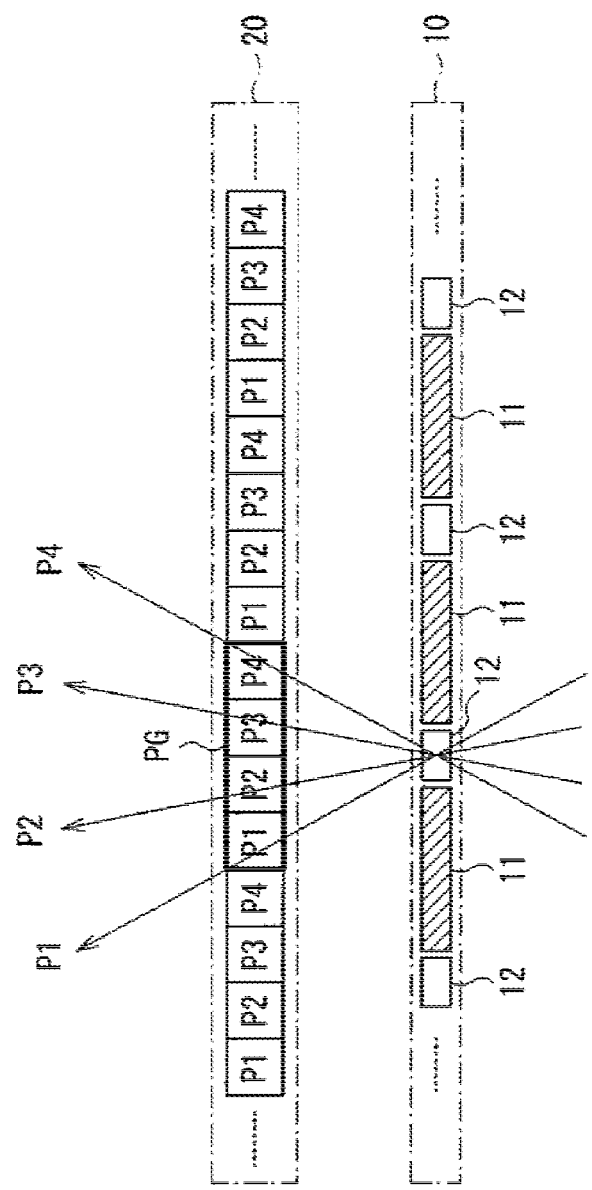
FIG. 26 is a schematic view illustrating an example of the operation of the 3D display device according to another modification.

In the above embodiments, the back light 30, the display part 20 and the barrier part 10 are disposed in this order. However, the embodiment is not limited to this. Alternatively, the back light 30, the barrier part 10 and the display part 20 may be disposed in this order as shown in FIG. 25. FIG. 26 illustrates an example of the operation of the display part 20 and the barrier part 10 according to a modification 1-6. In this modification, the light beams output from the back light 30 enter into the barrier part 10 first. In the entered light beams, the light beams that pass through the open/close part 12 are modulated by the display part 20 to output four viewpoint images.

[Modification 1-7]

In the above embodiment, the display part 20 and the back light 30 are used. However, the embodiment is not limited to this. Alternatively, for example, a display part such as EL (Electro Luminescence) may be employed.

[Modification 1-8]

Figure 27:
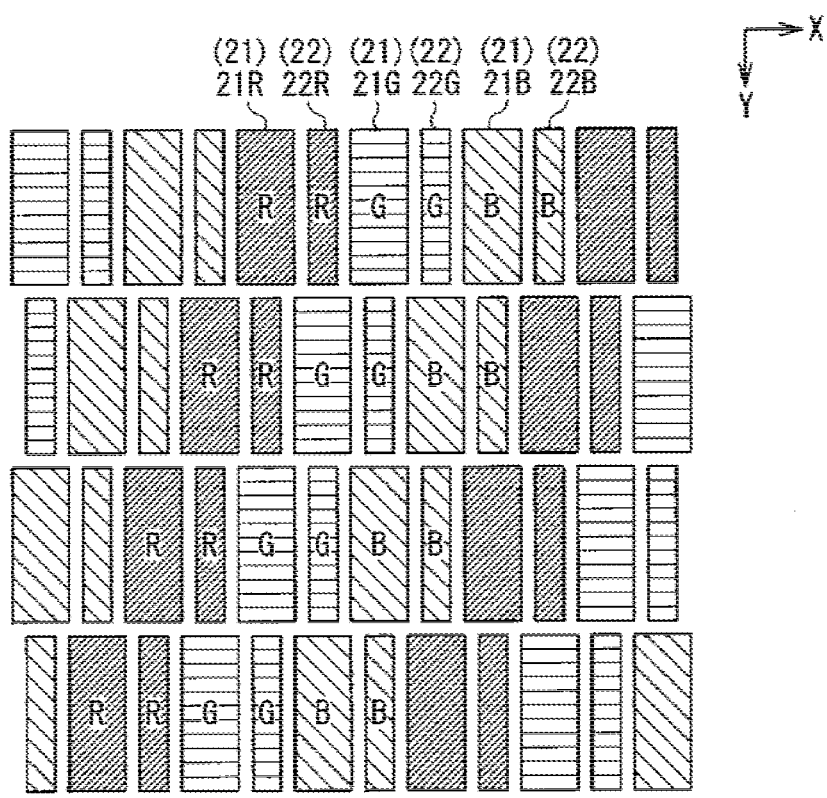
FIG. 27 is a plan view illustrating an example of the configuration of the display part according to another modification.
Figure 28:
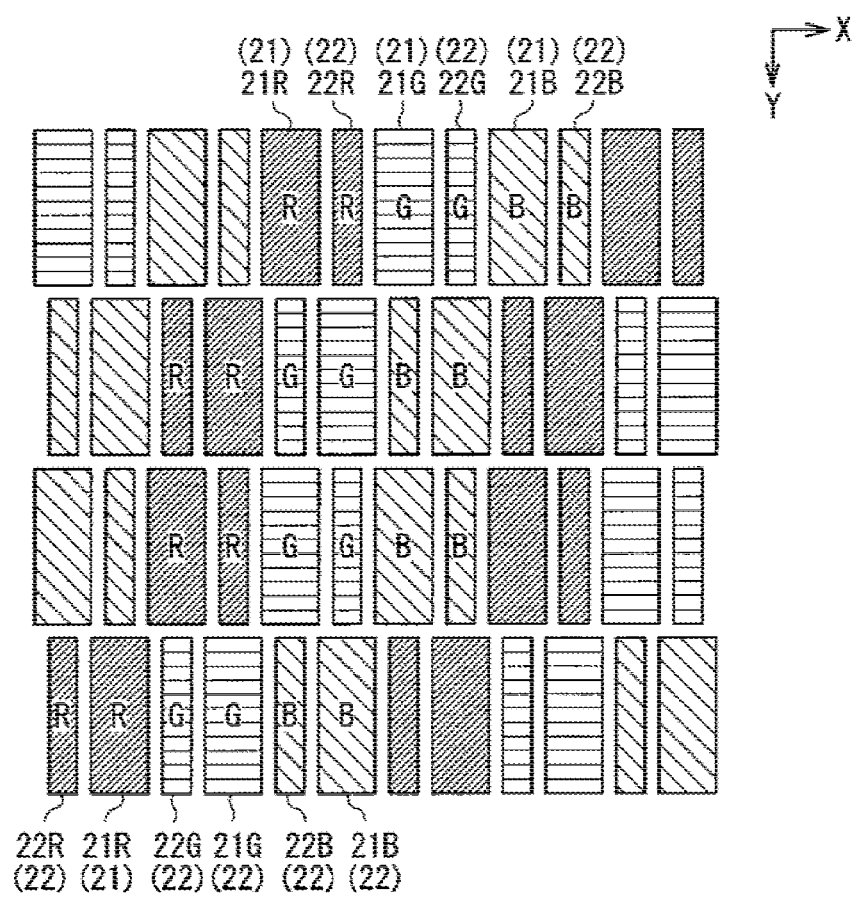
FIG. 28 is a plan view of another example of the configuration of the display part according to another modification.

In the above embodiment, the sub-pixels 21R, 22B, 21G, 22R, 21B, and 22G are repeatedly disposed in this order in the horizontal direction X. However, the embodiment is not limited to this. Alternatively, the sub-pixels may be repeatedly disposed in order of 21R, 22G, 21G, 22B, 21B and 22R for example, as shown in FIG. 27; or the disposition of the sub-pixels 21 and 22 may be changed on the line-basis as shown in FIG. 28.

Figure 29:
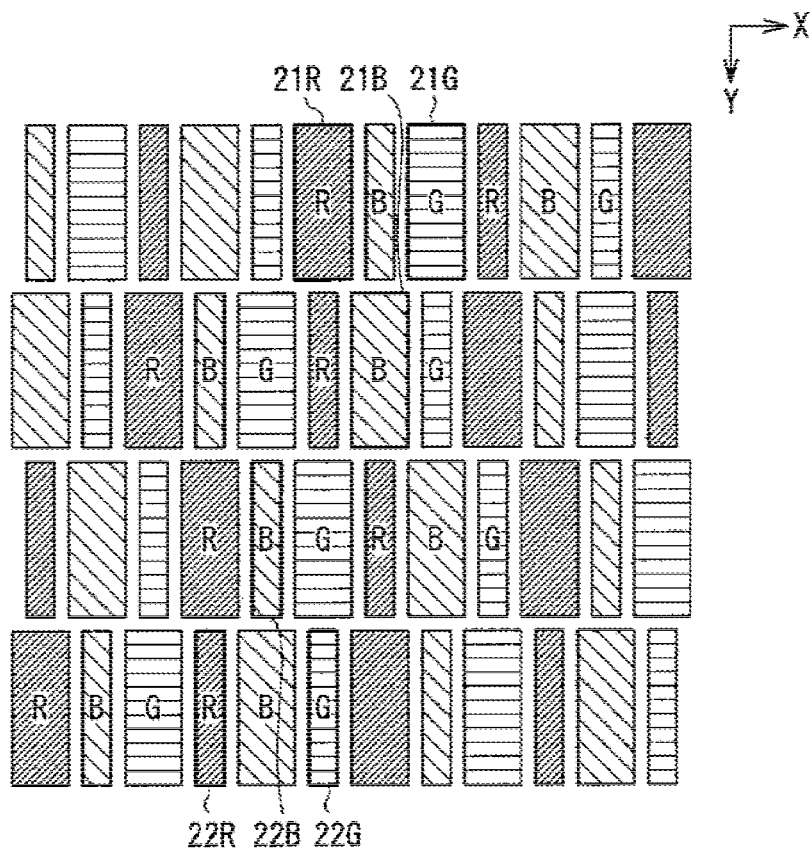
FIG. 29 is a plan view of another example of the configuration of the display part according to another modification.

Also, for example, the sub-pixels 21R, 21G, 21B may be disposed adjacent to each other; and likewise the sub-pixels 22R, 22G, 22B may be disposed adjacent to each other as shown in FIG. 29. In this example, for example, the sub-pixels 21R and 21G are disposed neighboring on each other being interposed by one sub-pixel 22 in the horizontal direction X, and the sub-pixel 21B is disposed neighboring on the interposed sub-pixel 22 in the vertical direction Y. Likewise, for example, the sub-pixels 22R and 22G are disposed neighboring on each other being interposed by one sub-pixel 21 in the horizontal direction X, and the sub-pixel 22B is disposed neighboring on the interposed sub-pixel 21 in the vertical direction Y. With this arrangement, the color balance during ordinary display (2D display) is improved.

[Modification 1-9]

In the above embodiment, the barrier part 10 is configured by using the open/close parts 11 and 12 capable of changing the transmissive ratio of the light beams. Alternatively, for example, the barrier part may be configured by using a fixed barrier which blocks the light beam at a portion corresponding to the open/close part 11, and opens the portion corresponding to open/close part 12 to allow the light to pass therethrough. In this case also, 3D display can be performed same as the above embodiment (FIG. 9 or the like). When performing ordinary display (2D display), for example, the four sub-pixels 21 (sub-pixel group PG) and four sub-pixels 22, which are disposed adjacent to the opening, display one piece of pixel information; thereby 2D image can be displayed.

[Modification 1-10]

In the above embodiments, the 3D display device of parallax barrier system is configured. However, the embodiment is not limited to this. Alternatively, for example, a 3D display device of a lenticular lens system may be configured. Detailed description is made below.

Figure 30:
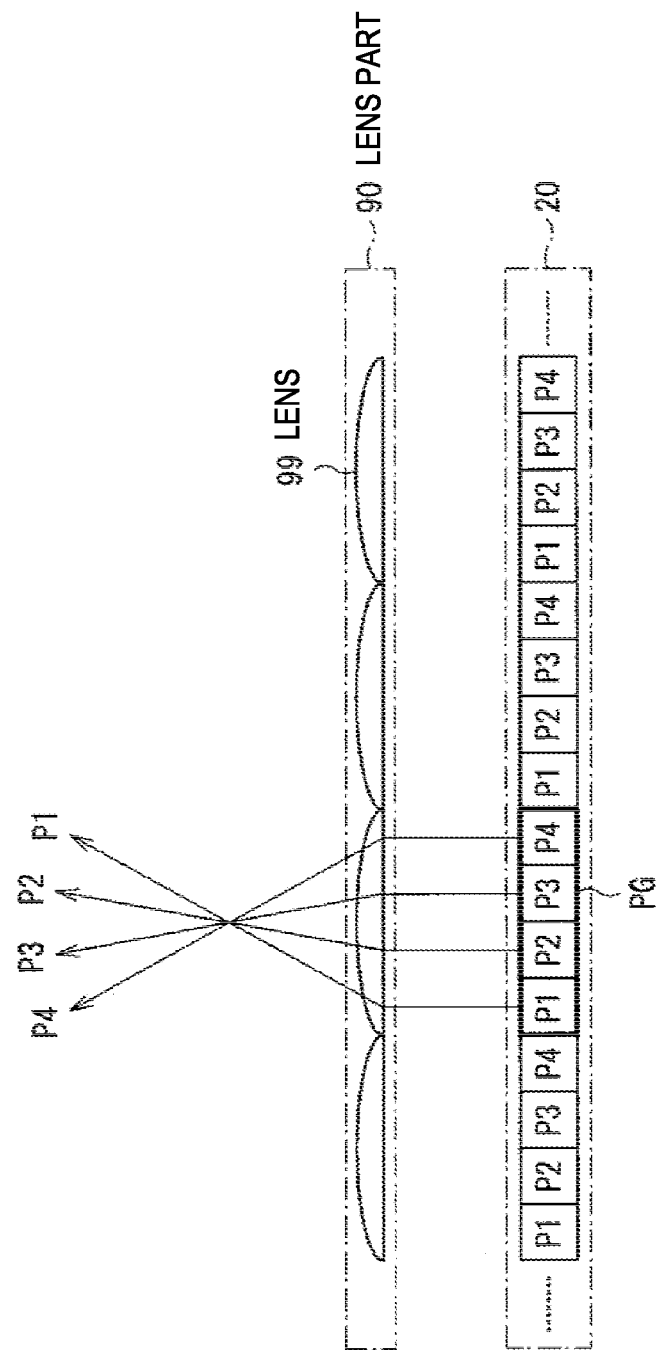
FIG. 30 illustrates a relationship between the barrier part and the display part according to another modification.

FIG. 30 illustrates an example of the operation of 3D display by a 3D display device 9 of a lenticular lens system. The 3D display device 9 includes a lens part 90 having a plurality of lenses 99 that refracts the light beams which are output from the back light 30 and pass through the display part 20. When performing 3D display, in the display part 20, the four sub-pixels 21 (sub-pixel group PG), which are disposed at the portions corresponding to each lens 99, displays four pieces of pixel information P1-P4 corresponding to four viewpoint images, respectively. The light beams output from the sub-pixels 21 in the display part 20 are refracted by the lenses 99 and are output in the respective directions.

As for the lenses 99, a lens with a fixed refraction index or, for example, a lens configured so that the characteristic such as refraction index is variable like a liquid crystal lens or a liquid lens may be employed.

2. Application Example

A description is made on an application examples of the 3D display device described in the above embodiment and modifications.

Figure 31:
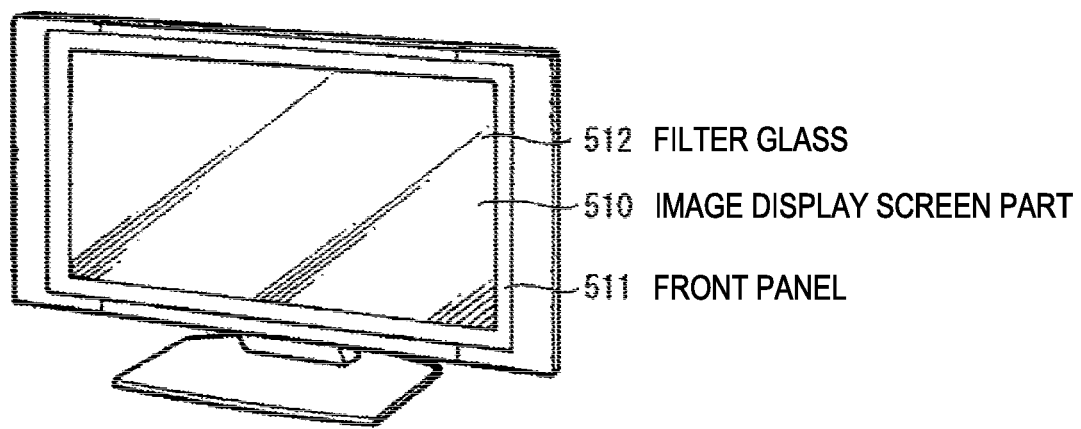
FIG. 31 is a perspective illustration showing an external configuration of a TV set to which the 3D display device according to an embodiment is applied.

FIG. 31 illustrates an appearance of a television set to which the 3D display device of the above embodiment or the like is applied. The television set has, for example, an image display screen part 510 including a front panel 511 and a filter glass 512. The image display screen part 510 is constituted of a 3D display device according to the above-described embodiment or the like.

The 3D display device of the above-described embodiment or the like is applicable to, in addition to such television set, electronic apparatus used in various fields including digital cameras, note type personal computers, mobile terminal apparatuses of mobile phones or the like, mobile game machines, video cameras and the like. In other words, the 3D display device of the above-described embodiment or the like is applicable to every electronic apparatuses for displaying images used in various fields.

It should be understood by those skilled in the art that various modifications, combinations, sub-combinations and alterations may occur depending on design requirements and other factors insofar as they are within the scope of the appended claims or the equivalents thereof.

In the above embodiments, it is configure to display four viewpoint images in the 3D display. However, the present technology is not limited to the above; but viewpoint images of three or less, or viewpoint images of five or more may be displayed.

Also, in the above-described embodiments, the present technology has been described while giving the 3D display device as an example. However, the present technology is not limited to the 3D display device. For example, the present technology may be applied to a multi-display. That is, in place of multiple viewpoint images, multiple images for multiple viewers may be displayed. For example, by displaying different images; i.e. an image to be viewed at the left side with respect the front side perpendicular to a display screen different from an image to be viewed at the right side with respect the front side perpendicular to a display screen; it is possible to achieve a multi-display.

Additionally, the present technology may also be configured as below.

(1) A display device, including:

a display part including a pixel of a first series having a first horizontal pixel width and a pixel of a second series having a second horizontal pixel width smaller than the first horizontal pixel width, the pixels of the first series and the pixels of the second series being arrayed alternately in each of a horizontal direction and a vertical direction; and a light beam control part that controls a light beam from the display part or a light beam toward the display part.

(2) The display device according to (1), wherein the display device has a plurality of display modes including a first display mode and a second display mode, in the first display mode, the pixels of the first series and the pixels of the second series display a single image, and in the second display mode, the pixels of the first series display a plurality of images and the pixels of the second series display a black color.

(3) The display device according to (2), wherein the distance between the pixels of the first series in the horizontal direction is equal to the first horizontal pixel width.

(4) The display device according to (2), wherein the distance between the pixels of the first series in the horizontal direction is smaller than the first horizontal pixel width.

(5) The display device according to (2), wherein the distance between the pixels of the first series in the horizontal direction is larger than the first horizontal pixel width.

(6) The display device according to any one of (3) to (5), wherein a central coordinate in the horizontal direction of each pixel of the first series is equal to a central coordinate in the horizontal direction of a pixel of the second series neighboring on the pixel of the first series in the vertical direction.

(7) The display device according to (1), wherein the display device has a plurality of display modes including a first display mode and a second display mode, in the first display mode, the pixels of the first series and the pixels of the second series display a single image, and in the second display mode, the pixels of the first series display a plurality of images and the pixels of the second series display a gray color.

(8) The display device according to any one of (2) to (7), wherein the light beam control part operates in the first display mode, in manner to allow light beams from the single image or light beams toward the single image to pass therethrough, and in the second display mode, in a manner to regulate light beams from the respective images displayed on the display part or light beams toward the respective images in a corresponding angular direction.

(9) The display device according to any one of (1) to (8), wherein the light beam control part is a barrier part that allows light to pass therethrough or blocks the same, and the barrier part includes a plurality of liquid crystal barriers of a first series and a plurality of liquid crystal barriers of a second series which are switchable between an open state and a closed state.

(10) The display device according to (9), wherein the plurality of liquid crystal barriers of the first series and the plurality of the liquid crystal barriers of the second series get into a transmissive state in the first display mode, and the plurality of liquid crystal barriers of the first series get into the transmissive state and the plurality of liquid crystal barriers of the second series get into a blocking state in the second display mode.

(11) The display device according to (10), wherein the plurality of liquid crystal barriers of the first series and the plurality of liquid crystal barriers of the second series extend in a predetermined direction.

(12) The display device according to (11), wherein a width of the liquid crystal barriers of the first series is smaller than the first horizontal pixel width.

(13) The display device according to any one of (1) to (8), wherein the light beam control part is a barrier part that allows light to pass therethrough or blocks the same, and the barrier part has a plurality of fixed openings.

(14) The display device according to any one of (1) to (8), wherein the light beam control part has a plurality of variable lenses capable of changing a refraction index.

(15) The display device according to any one of (1) to (8), wherein the light beam control part has a plurality of fixed lenses.

(16) The display device according to any one of (1) to (15), further including a back light, wherein the display part is a liquid crystal display part, and the liquid crystal display part is disposed between the back light and the barrier part.

(17) The display device according to any one of (1) to (15), further including a back light, wherein the display part is a liquid crystal display part, and the barrier part is disposed between the back light and the liquid crystal display part.

(18) A display panel, including:

a pixel of a first series having a first horizontal pixel width; and a pixel of a second series having a second horizontal pixel width smaller than the first horizontal pixel width, wherein the pixels of the first series and the pixels of the second series are arrayed alternately in each of a horizontal direction and a vertical direction.

(19) An electronic apparatus, including:

a display unit; and a control unit that performs operation control by using the display unit, wherein the display unit includes
a display part in which a pixel of a first series having a first horizontal pixel width and a pixel of a second series having a second horizontal pixel width smaller than the first horizontal pixel width are arrayed alternately in each of a horizontal direction and a vertical direction; and
a light beam control part that controls a light beam from the display part or a light beam toward the display part.

The present disclosure contains subject matter related to that disclosed in Japanese Priority Patent Application JP 2011-214867 filed in the Japan Patent Office on Sep. 29, 2011, the entire content of which is hereby incorporated by reference.

What is claimed is:

1. A display device, comprising:
    a display part including (a) pixels of a first series each having a first horizontal pixel width and (b) pixels of a second series each having a second horizontal pixel width smaller than the first horizontal pixel width, the pixels of the first series and the pixels of the second series being arrayed alternately in each of a horizontal direction and a vertical direction;
    a light beam control part that controls a light beam from the display part or a light beam toward the display part, the light beam control part including a parallax barrier comprised of (a) first series barriers or openings and (b) second series barriers arrayed alternately in the horizontal direction,
    a display drive section to drive the display part by applying an image signal including a 2D image signal or a 3D image signal; and
    a barrier drive section to drive the parallax barrier by applying a barrier control signal,
    wherein,
        the display device has a plurality of display modes including a first display mode and a second display mode,
        in the first display mode (1) the display drive section applies the 2D image signal to the display part, (2) the parallax barrier is driven by the barrier control signal such that first series barriers or openings and second series barriers are in a transmissive state, and (3) the pixels of the first series and the pixels of the second series jointly display an image in accordance with the 2D image signal,
        in the second display mode (1) the display drive section applies the 3D image signal to the display part, (2) the parallax barrier is driven by the barrier control signal such that the first series barriers or openings are in a transmissive state and the second series barriers are in a non-transmissive state, and (3) the pixels of the first series display a plurality of images via the first series barriers or openings and the pixels of the second series only display a black color or a gray color in accordance with the 3D image signal, and
        the pixels of the first series are grouped into groups of four neighboring pixels with each pixel of a group corresponding to a respective viewpoint.

2. The display device according to claim 1, wherein the distance between the pixels of the first series in the horizontal direction is equal to the first horizontal pixel width.

3. The display device according to claim 2, wherein a central coordinate in the horizontal direction of each pixel of the first series is equal to a central coordinate in the horizontal direction of a pixel of a second series neighboring on the pixel of the first series in the vertical direction.

4. The display device according to claim 1, wherein the distance between the pixels of the first series in the horizontal direction is smaller than the first horizontal pixel width.

5. The display device according to claim 1, wherein the distance between the pixels of the first series in the horizontal direction is larger than the first horizontal pixel width.

6. The display device according to claim 1, wherein the parallex barrier is comprised of the first and second series barriers.

7. The display device according to claim 6, wherein the first and second series barriers are switchable liquid crystal barriers.

8. The display device according to claim 6, wherein the first series barriers and the second series barriers extend in a predetermined direction.

9. The display device according to claim 8, wherein a width of the first series barriers is smaller than the first horizontal pixel width.

10. The display device according to claim 1, the second series barriers are switchable liquid crystal barriers.

11. The display device according to claim 1, wherein the parallax barrier is comprised of openings and the second series barriers.

12. The display device according to claim 1, further comprising a back light, wherein:
    the display part is a liquid crystal display part, and
    the liquid crystal display part is disposed between the back light and the parallax barrier.

13. The display device according to claim 1, further comprising a back light, wherein:
    the display part is a liquid crystal display part, and
    the parallax barrier is disposed between the back light and the liquid crystal display part.

14. The display device of claim 1, wherein, for a given group of four neighboring pixels of the first series, two of the pixels are a one color and two of the pixels are of another color.

15. The display device of claim 1, wherein, for a given group of four neighboring pixels of the first series, two of the pixels are in one horizontal row and two of the pixels are in another horizontal row.

16. A display panel, comprising:
    pixels of a first series each having a first horizontal pixel width;
    pixels of a second series each having a second horizontal pixel width smaller than the first horizontal pixel width;
    a parallax barrier comprised of (a) first series barriers or openings and (b) second series barriers;
    a display drive section to drive the display pixels by applying an image signal including a 2D image signal or a 3D image signal; and
    a barrier drive section to drive the parallax barrier by applying a barrier control signal,
    wherein,
        the pixels of the first series and the pixels of the second series are arrayed alternately in each of a horizontal direction and a vertical direction,
        the display device has a plurality of display modes including a first display mode and a second display mode,
        in the first display mode (1) the display drive section applies the 2D image signal to the pixels, (2) the parallax barrier is driven by the barrier control signal such that the first series barriers or openings and second series barriers are in a transmissive state, and (3)

the pixels of the first series and the pixels of the second series jointly display an image in accordance with the 2D image signal, in the second display mode (1) the display drive section applies the 3D image signal to the pixels, (2) the parallax barrier is driven by the barrier control signal such that the first series barriers or openings are in a transmissive state and the second series barriers are in a non-transmissive state, and (3) the pixels of the first series display a plurality of images via the first series barriers or openings and the pixels of the second series only display a black color or a gray color in accordance with the 3D image signal, and in the second display mode, the pixels of the first series are grouped into groups of four neighboring pixels with each pixel of a group corresponding to a respective viewpoint.

17. An electronic apparatus, comprising:
a display unit; and
a control unit that controls operations of the display unit, wherein,
the display unit includes a display part in which pixels of a first series each having a first horizontal pixel width and pixels of a second series each having a second horizontal pixel width smaller than the first horizontal pixel width are arrayed alternately in each of a horizontal direction and a vertical direction,
the display unit includes a light beam control part that controls a light beam from the display part or a light beam toward the display part, the light beam control part including a parallax barrier comprised of (a) first series barriers or openings and (b) second series barriers arrayed alternatively in the horizontal direction,
the display unit includes a display drive section to drive the display part by applying an image signal including a 2D image signal or a 3D image signal,
the display unit includes a barrier drive section to drive the parallax barrier by applying a barrier control signal,
the display device has a plurality of display modes including a first display mode and a second display mode,
in the first display mode (1) the display drive section applies the 2D image signal to the display part, (2) parallax barrier is driven by the barrier control signal such that the first series barriers or openings and second series barriers are in a transmissive state, and (3) the pixels of the first series and the pixels of the second series jointly display an image in accordance with the 2D image signal,
in the second display mode (1) the display drive section applies the 3D image signal to the display part, (2) the parallax barrier is driven by the barrier control signal such that the first series barriers or openings are in a transmissive state and the second series barriers are in a non-transmissive state, and (3) the pixels of the first series display a plurality of images via the first series barriers or openings and the pixels of the second series only display a black color or a gray color in accordance with the 3D image signal, and in the second display mode, the pixels of the first series are grouped into groups of four neighboring pixels with each pixel of a group corresponding to a respective viewpoint.

18. A display device, comprising:
a display part including (a) pixels of a first series each having a first horizontal pixel width and (b) pixels of a second series each having a second horizontal pixel width smaller than the first horizontal pixel width, the pixels of the first series and the pixels of the second series being arrayed alternately in each of a horizontal direction and a vertical direction;
a light beam control part that controls a light beam from the display part or a light beam toward the display part;
a display drive section to drive the display part by applying an image signal including a 2D image signal or a 3D image signal; and
a barrier drive section to apply a barrier control signal, wherein,
the light beam control part has a parallax barrier part that includes a plurality of liquid crystal barriers including first series barriers and second series barriers which are switchable between an open state passing light and a closed state blocking light,
the parallax barrier is driven by application of the barrier control signal,
the display device has a plurality of display modes including a first display mode and a second display mode,
in the first display mode (1) the display drive section applies the 2D image signal to the display part, (2) the parallax barrier is driven by the barrier control signal such that the first series barriers or openings and second series barriers are in a transmissive state, and (3) the pixels of the first series and the pixels of the second series jointly display an image in accordance with the 2D image signal,
in the second display mode (1) the display drive section applies the 3D image signal to the display part, (2) the parallax barrier is driven by the barrier control signal such that the first series barriers or openings are in a transmissive state and the second series barriers are in a non-transmissive state, and (3) the pixels of the first series display a plurality of images via the first series barriers or openings and the pixels of the second series only display a black color or a gray color in accordance with the 3D image signal, and
in the second display mode, the pixels of the first series are grouped into groups of four neighboring pixels with each pixel of a group corresponding to a respective viewpoint.

* * * * *